(12) United States Patent
Baruch

(10) Patent No.: US 7,557,935 B2
(45) Date of Patent: Jul. 7, 2009

(54) OPTICAL COORDINATE INPUT DEVICE COMPRISING FEW ELEMENTS

(75) Inventor: Itzhak Baruch, 4 Avtalyon St., Apt. 8, Herzeliya (IL) 46476

(73) Assignee: Itzhak Baruch, Herzeliya (IL)

( * ) Notice: Subject to any disclaimer, the term of this patent is extended or adjusted under 35 U.S.C. 154(b) by 472 days.

(21) Appl. No.: 10/556,026

(22) PCT Filed: Dec. 3, 2003

(86) PCT No.: PCT/IL03/01021

§ 371 (c)(1),
(2), (4) Date: Nov. 7, 2005

(87) PCT Pub. No.: WO2004/102523

PCT Pub. Date: Nov. 25, 2004

(65) Prior Publication Data

US 2008/0062149 A1 Mar. 13, 2008

(51) Int. Cl.
*G01B 11/14* (2006.01)
*G06F 3/042* (2006.01)
*G01N 21/86* (2006.01)

(52) U.S. Cl. .................. 356/614; 250/227.21; 250/221; 345/158; 345/175; 345/179

(58) Field of Classification Search .............. 250/221, 250/206.1, 216, 227.21, 227.22; 356/614, 356/625; 345/168, 175, 170, 18.11, 156; 703/14, 48, 908

See application file for complete search history.

(56) References Cited

U.S. PATENT DOCUMENTS

| | | | | | |
|---|---|---|---|---|---|
| 4,335,305 | A | * | 6/1982 | Seachman | 250/216 |
| 5,317,140 | A | * | 5/1994 | Dunthorn | 250/221 |
| 6,008,798 | A | * | 12/1999 | Mato et al. | 345/168 |
| 6,611,252 | B1 | * | 8/2003 | DuFaux | 345/168 |
| 6,760,009 | B2 | * | 7/2004 | Omura et al. | 345/157 |
| 7,133,022 | B2 | * | 11/2006 | Grabert | 345/156 |
| 7,242,388 | B2 | * | 7/2007 | Lieberman et al. | 345/158 |
| 7,305,368 | B2 | * | 12/2007 | Lieberman et al. | 706/14 |

* cited by examiner

Primary Examiner—Sang Nguyen

(57) ABSTRACT

The present invention is an optical electronic input device for identifying the coordinates of an object in a given area. The device may capture two-dimensional or three-dimensional input information, using a minimal number of optical units (one for two dimensional coordinates and two for three dimensional coordinates). The invention requires only basic optical elements such as a photo sensing unit, lenses, a light source, filters and shutters which may reduce manufacturing costs significantly. Since this device enables inputting the coordinates of an object in a set area, it may not only be used in systems such as optical touch screens, but also in virtual keyboard applications and in implementation for machine vision.

25 Claims, 41 Drawing Sheets

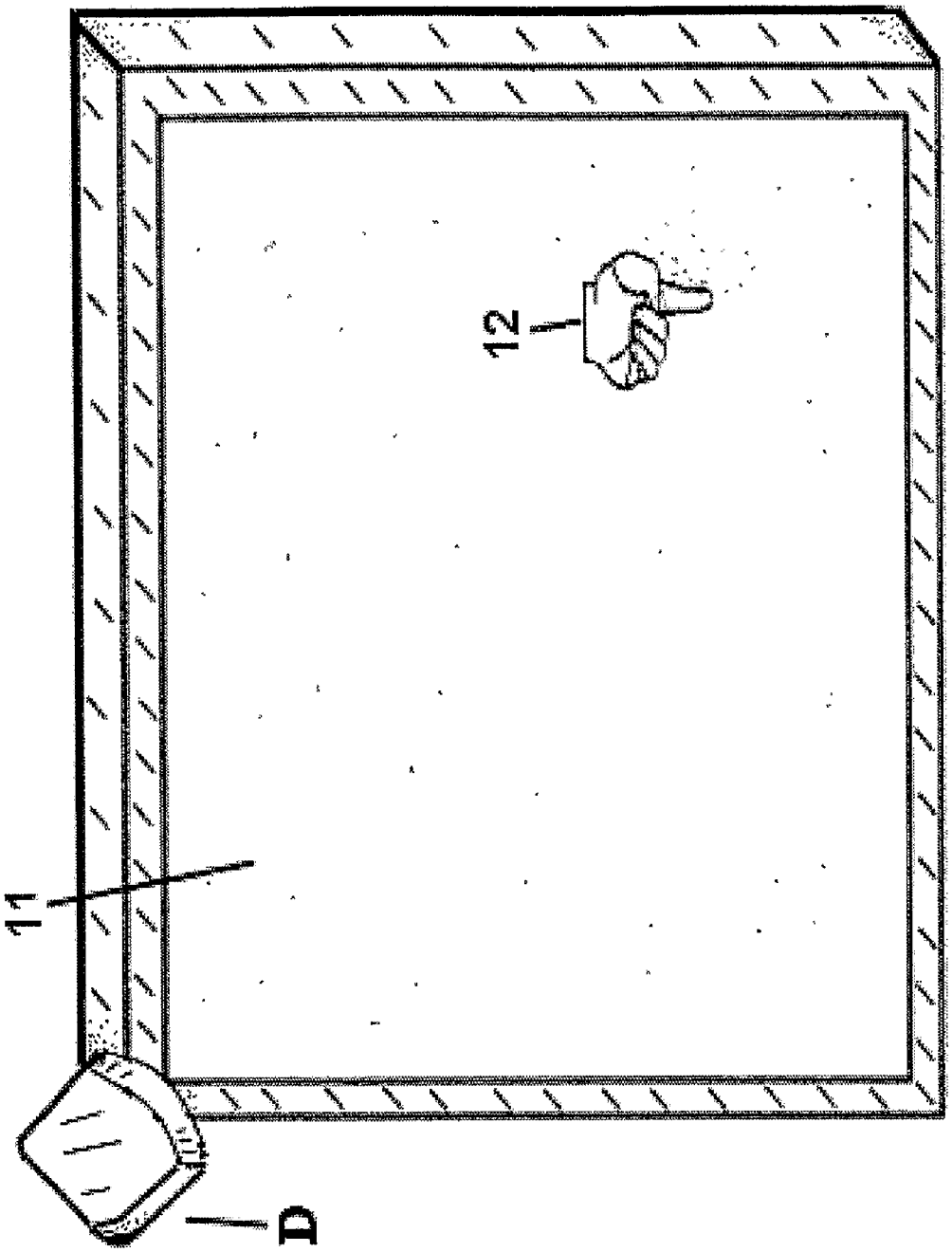

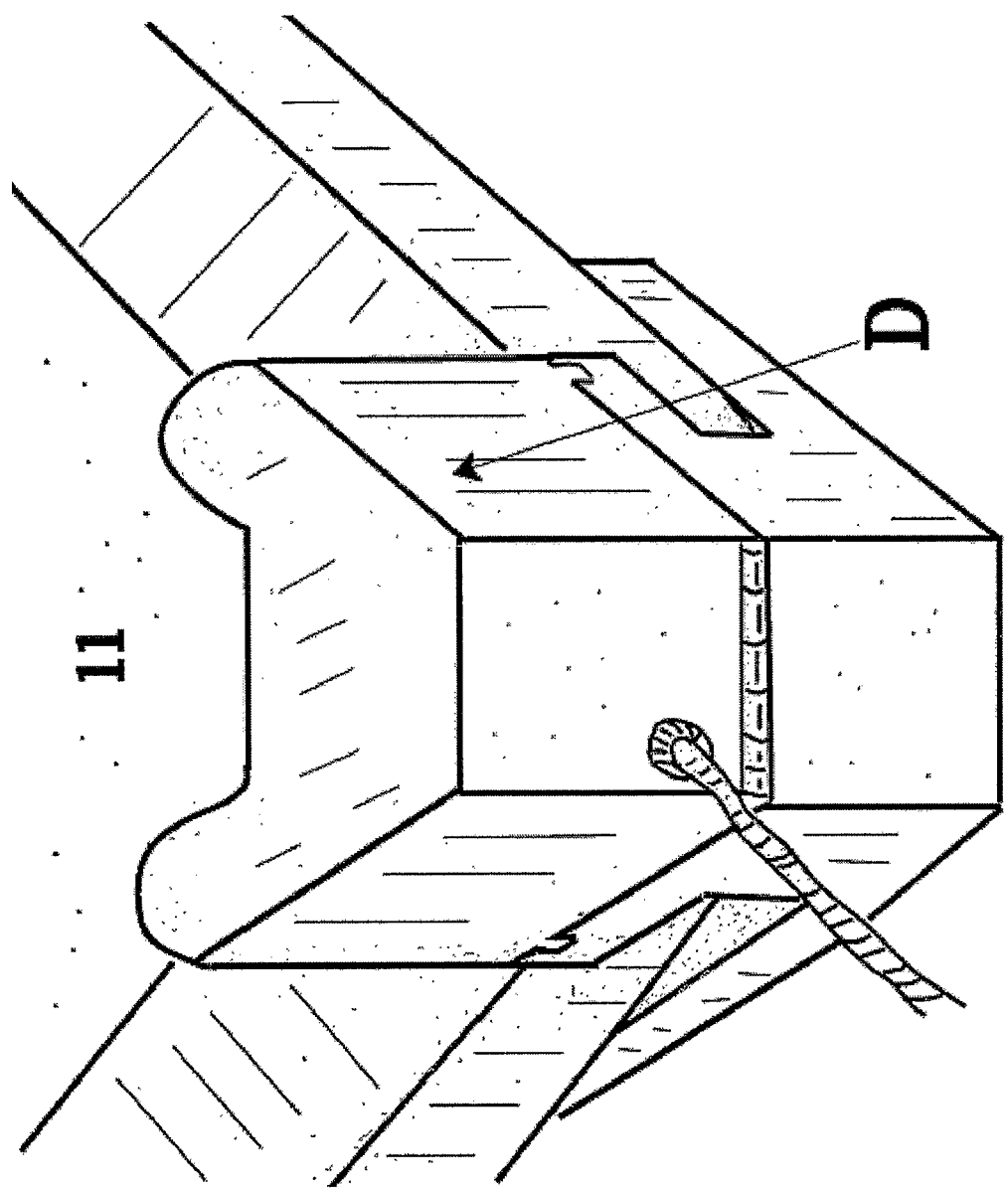

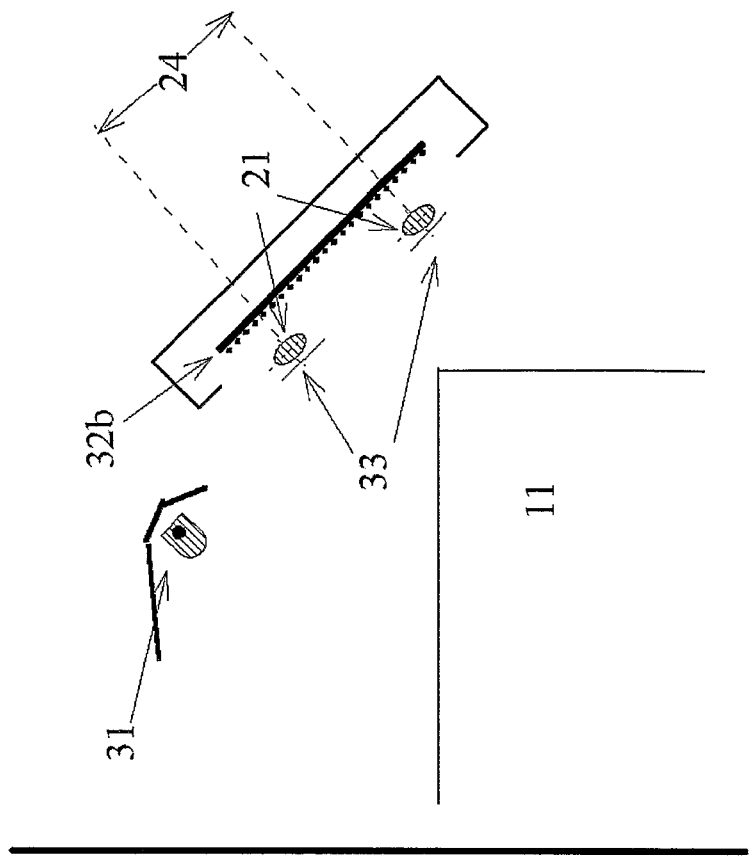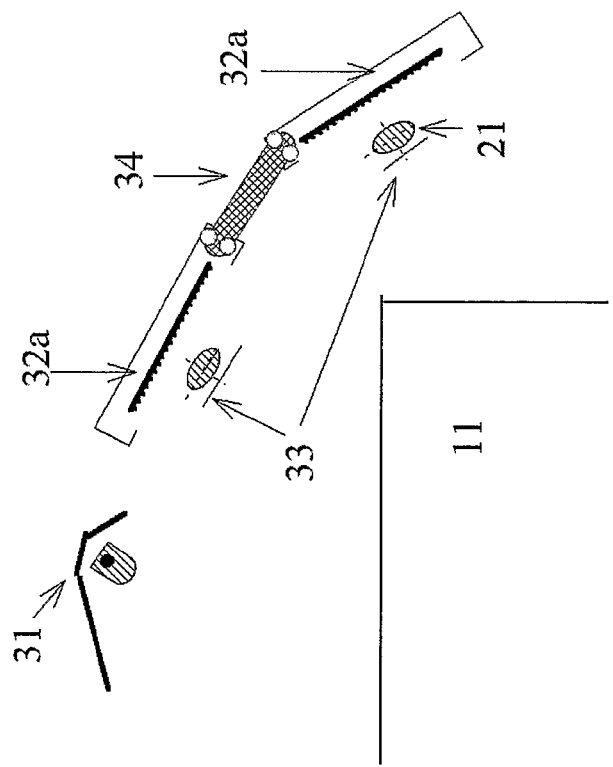
Figure 3

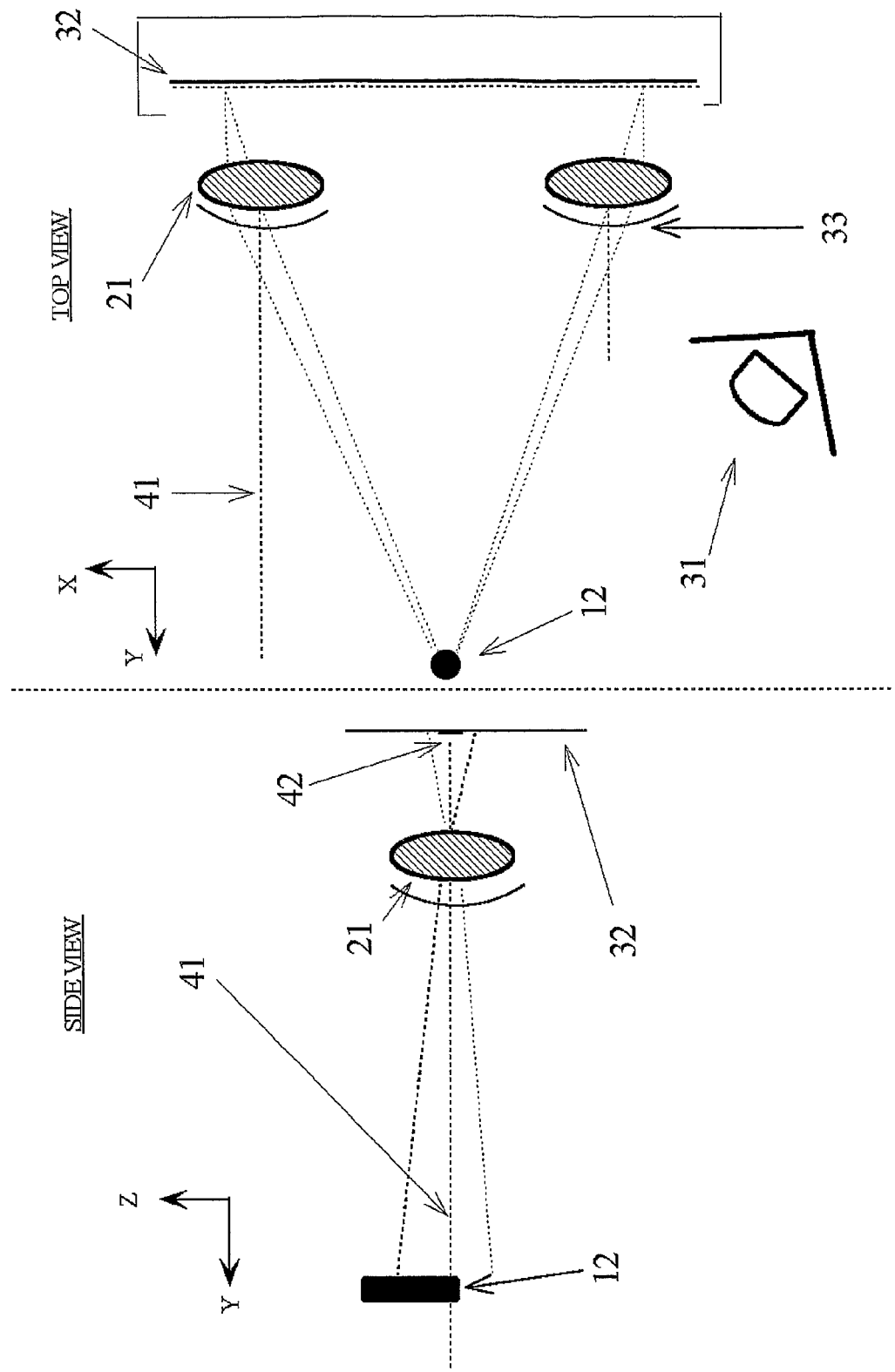

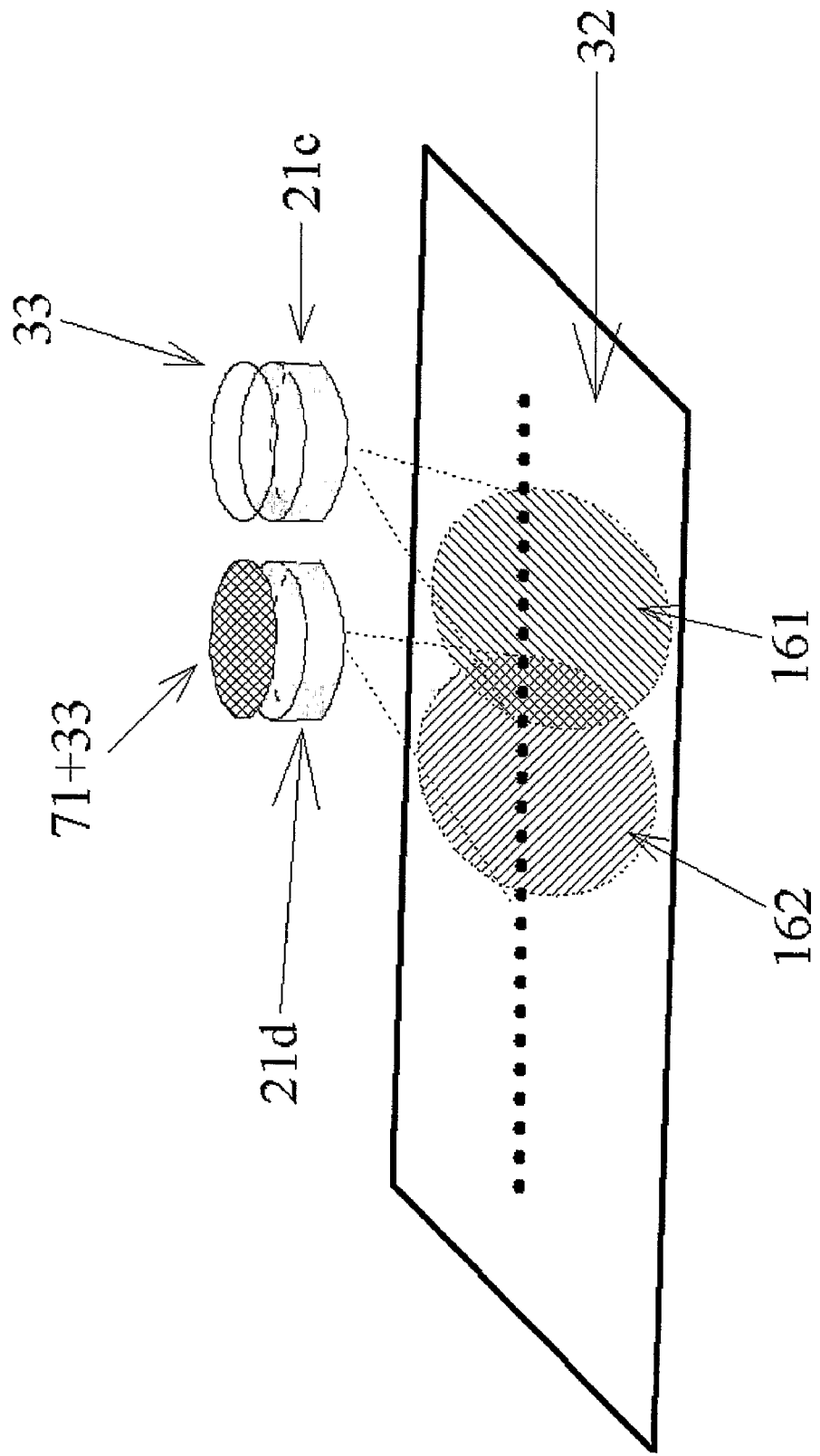

Figure 20 Front view three-coordinate embodiment

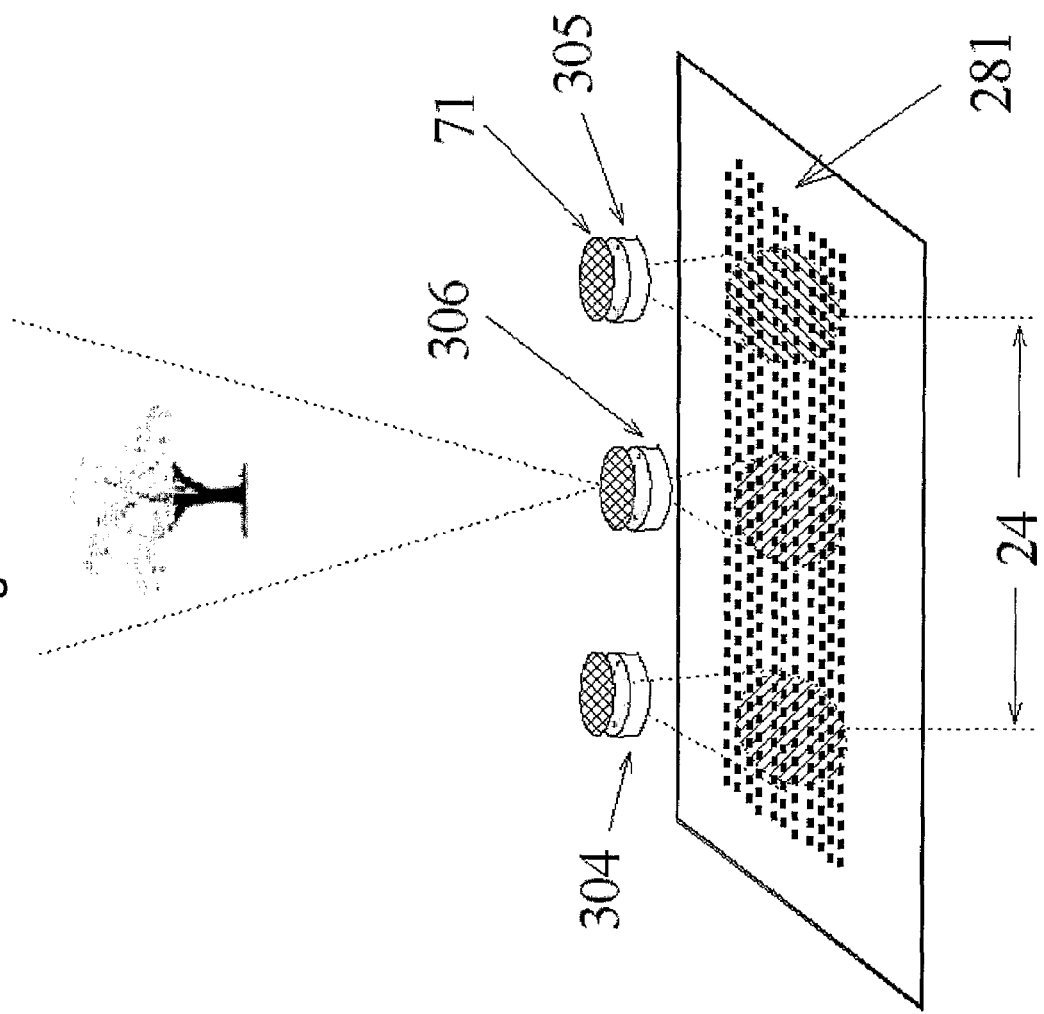

OPTICAL COORDINATE INPUT DEVICE COMPRISING FEW ELEMENTS

FIELD OF THE INVENTION

The present invention relates to an optical input system for measuring an object's three-dimensional coordinates, with a special reference made to the light receiving unit wherein a number of optical elements are being used in combination with photo sensing devices. The invention enables usage of one input unit with minimal sensing devices while increasing the viewing angle of such input devices. Furthermore, the present invention relates to usage of such systems in applications or computer coordination input devices such as an optical touch screen, virtual keyboard applications, and implementation for machine vision.

BACKGROUND

Various systems are known in the art for detecting an object coordinates. Some of such systems are touch screens and blackboard inputting devices. These systems usually detect coordinates of a pointing instrument such as a pen, a fingertip or a special device designed for use with such system.

Among the methods of operation of such input devices are methods based on sensitivity to physic contact resistive layers, acoustical radiation, electromagnetic radiation, capacitive means and the like.

Among the non-touch system are optical systems that are able to detect two-coordinate position of an object. Some of these systems are based on one or two scanning devices attached to a blackboard or a computer display. Scanning systems are based on a rotating mirror or rotating light source emitting light beam that scans a thin space located in close proximity to the screen display or to the blackboard.

Some of these types of systems are comprised of a rotating half mirror emitting the scanning light beam and reflecting the returned light from an object placed in front of the device to a light sensitive device. Two such units may be used in order to be able to implement triangulation methods. Other methods use only one such unit with addition of mirrors surrounding part of the display frame, by analyzing the light reflections from these mirrors the coordinates of an object placed within the frame boundaries are found.

In U.S. Pat. No. 5,455,669 a similar scanner device is used operating on measuring the time of fight of a light beam transmitted to the object. One disadvantage of such scanning system is the need to have moving parts such as a mirror. These motor-based devices are suitable mostly for large blackboard inputting systems, and not so much for computer display monitor applications or virtual keyboard applications.

A device with stand-alone unit is described in U.S. Pat. No. 5,502,568. This device is based on a pen that is comprised of a special modulation circuit driving a light source embedded inside the pen. The usage of such system is limited because of the special pen circuit; it is not possible to use a simple object such as a regular pen or a human finger to operate the device.

Other types of such devices are based upon two light receiving units such as video cameras placed on various locations around the blackboard or the display unit. Such arrangement can be found in PCT International Publication No. WO 00/21023 or in U.S. Patent Application Publication No. 2001/0,030,642.

Similar types of devices are optical devices which are based on Charged Coupled Devices (CCD) or other photo sensitive sensors. These devices include a lens placed in front of the photo sensitive device inside each such unit. These units are placed on different locations on the blackboard or the display unit. The method of operation of such devices is based on triangulation analysis of the images that fall on the photo sensitive devices. Most of these systems usually contain an Infra Red (IR) light source and a matched spectral filter in order to filter ambient light noises.

U.S. Pat. No. 4,782,328 describes such two units which each are comprised of linear CCD and one wide viewing lens system in front of the CCDs. The wide-angle lens system enables viewing the plane above the display unit while each such unit is installed in close proximity to the display frame. Other two-unit systems are described in U.S. Pat. No. 6,421,042. This patent describes a two-unit system with one lens included in each such unit. In addition, a third coordinate measurement option is presented.

The main disadvantage of these two last patents is the fact that two units are needed in each system. Another disadvantage is the fact that in the first patent a wide-angle lens system is needed, and in the second patent only a limited viewing angle is possible thus, the units of such system need to be installed with some distance from a screen display frame.

As mentioned above additional usage of the embodiments is in implementation of a virtual keyboard.

Virtual keyboard applications are described in various patents. PCT International Publication No. WO 02/057714 A1 describes such system while using a method of measuring time of flight of a light that is projected on the user hands. By analyzing the three dimensional image received the system can determine the keystroke on the virtual keyboard.

Another virtual keyboard device is described in European Patent Application EP 1,248,227 A2 while using one viewing unit which comprises a complex optical device or two CCDs to project the same image from different viewing angles into the CCD/s.

BRIEF DESCRIPTION OF THE DRAWINGS

The above and other objects, features and advantages of the present invention will be apparent from the following descriptions of preferred embodiments of the invention explained with reference to the accompanying drawings, in which:

FIG. 1 is a summarized diagram showing a concept of an optical coordinate input device attached to a rectangular measurement enclosure while a pointing finger inserted into this measurement enclosure.

FIG. 1a is a perspective view of an optical measurement unit attachment arrangement to a display frame.

FIG. 3 is a summarized diagram showing at the right side a top view of one photo sensing device with two lenses placed in front of it, and on the left side a top view of two photo sensing devices with one lens placed in front of each photo sensing device.

FIG. 4 is a summarized diagram showing at the right side a top view, and at the left side a side view of one photo sensing device wherein two spherical lenses are placed in front of the photo sensing device.

FIG. 16 is a summarized diagram perspective view showing a photo sensing device where two lenses are placed in front of it while both captured images fall partly one on top of the other; on both lenses a spectrum filter is placed while an electronic shutter is placed over only one of the lenses.

FIG. 30a is a summarized prospective view diagram showing the concept of three-dimensional surface curvature measurement of an object while placing an additional object imaging lens in the front of the photo sensing device.

SUMMARY OF THE DISCLOSURE

Figure 2:
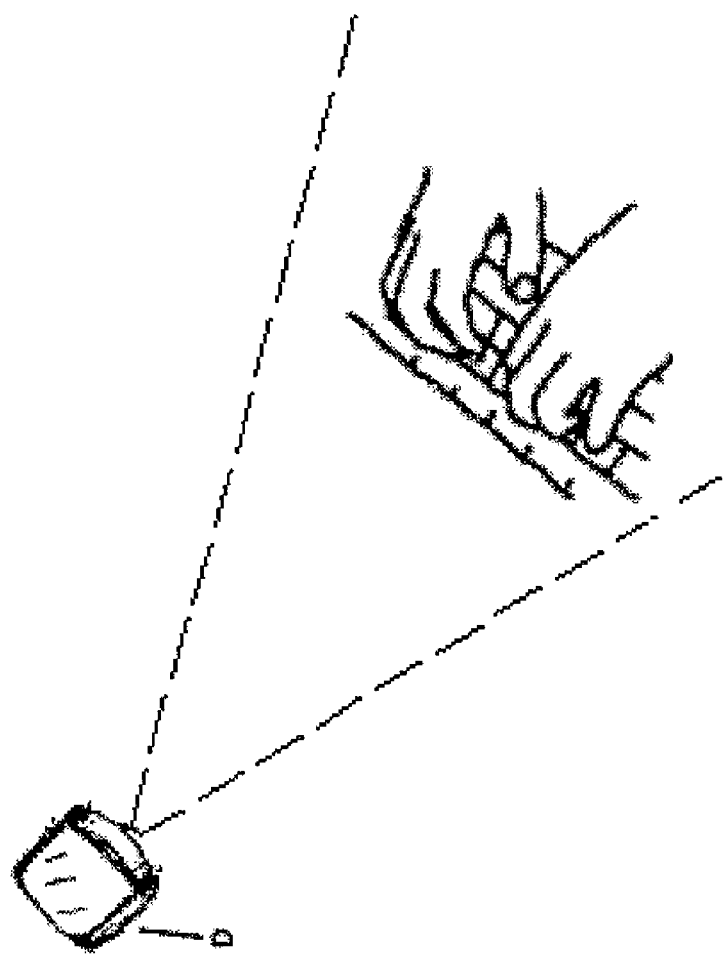
FIG. 2 is a summarized diagram showing a concept of a virtual keyboard in which an optical device is placed in front of typing hands; the device is used as an input apparatus to a computer system for determining keystrokes on such virtual keyboard.

The present invention provides an optical unit for an object coordinates determination by using minimal number of components, this unit can be realized with only one unit, in contrast to prior art device types which are usually comprised of few units or use a special object to be used as a pointing device. In addition, the preset invention requires only basic optical elements such as a photo sensing unit, lenses, light source, filter or shutters thus, it can be manufactured for low cost.

Minimal optical parts are used in order to achieve the simplicity of the optical device. In one of the embodiment, one unit that is mounted on the corner of the computer screen monitors the area immediately in front of the screen, the main advantage of this embodiment is the fact that it can be comprised of one photo-sensing device in a relatively small unit. Additional advantage over units presented in prior art is the fact that majority of the suggested embodiments can be installed in close proximity to a screen display corner while operating at a large viewing angle, thus saving valuable space for the user while increasing the usability of such device.

In some of the embodiments an added functionality is integrated into the device by adding a linear photo sensing device with a lens in order to measure the relative height coordinate of a pointing object. Such configuration can be added to any of the two coordinate embodiments.

According to the basic embodiment of the present invention, an object coordinates detecting optical unit is provided, which can be placed near a measurement area/space. The light scattered from the object placed within such area/space is condensed by a lens and projected into the active surface of the photo sensing device. At least one additional lens is placed in front of this photo sensing unit in order to create two viewing angles from the same base-line. The lenses are placed at the farthest possible location from each other in order to create a long enough base line. By using triangulation method the location of the coordinates of the object created are extracted. A variety of configurations with different number of lenses and photo sensing devices are possible.

In addition, two basic shapes of lenses can be used, one is a spherical lens and the other is a cylindrical lens. Cylindrical lens usage is appropriate mainly when the amount of light reflected or projected from the object is strong enough in order to create the image intensity required for the coordinate analysis.

Further, the coordinate input apparatus in accordance with the present invention can be provided with additional lenses or photo sensing devices in order to enable large viewing-angle, thus it enables immediate attachment of such device near its measurement space. Such large viewing angle is created by placing the lenses and the photo sensing devices in specific locations and angles.

These wide angle configurations can be integrated into a photo sensing unit which uses Time Of Flight (TOF) of the light in order to capture a three-coordinate image, enabling the placement of such measurement device its measurement space.

Electronic shutters may be used in order to separate the images reflected on the photo sensing device surface, two methods are possible for reducing the number of such shutters. The first method depends on the physical dimensions of the various system components. The other method is based on operation of electronic means in order to subtract one image from the other, thus revealing both images that are necessary for a triangulation calculation.

Further, the coordinate input apparatus in accordance with the present invention can be provided with additional coordinate measurement unit for additional coordinate detection, such as a three-coordinate device. In one of the embodiment of this invention additional linear photo sensing device is being used with a combination of at least one toroidal lens. Such lens condenses the light rays from a specific section of the measurement space on the linear photo sensing device enabling measurement of the height coordinate of such object. The object height is determent by using triangulation method while taking into account the distance of the object measured by the two-coordinate unit.

In other embodiments, an area photo sensing device is suggested to be used within a two-coordinate measurement unit in order to enable the third coordinate measurement. In such configurations the height of the object is determined according to its image's projected on one of the area photo sensing unit pixel column.

Additional usage of the present invention can be found in machine vision while two lenses are being placed in front of an area photo sensing device. By using the two images projected on the photo sensing device and using mathematical methods the location and basic shapes of such objects can be found. This feature is practical in machine vision field for monitoring objects that are placed in a relatively close proximity to the device.

In addition, the same basic configuration can be used for applications of a virtual keyboard. In such applications a computer keyboard is being projected on a flat surface or a drawing of a keyboard is attached to such surface. By capturing two images from different viewing angles the distance of the fingers can be determined thus, enabling the computer system to decide which specific key is pressed.

DETAILED DESCRIPTION OF THE PREFERRED EMBODIMENTS

The main feature of the present invention is the use of a one-unit device having a simple optical configuration that is capable of finding the coordinates of an arbitrary object within a wide viewing angle.

In several of the preferred embodiments described in the present invention, a rectangular measurement area is presented while the device is placed near one of the corners of the measurement area. The methods described here enable placement of the device relatively close to such corners enabling practical installation on a display frame while consuming minimal space at a lower cost than two-unit configurations.

In other preferred embodiments described in the present invention, a three-dimensional image representation may be obtained by using a simple optical configuration. The use of such embodiments may relate to places were a limited space is available while three-dimensional information is needed from objects placed relatively in close range to the device.

The invention is envisioned in several different embodiments. The components of each embodiment and further details are described below. The basic suggested method (FIG. 1) is based on a device D that is attached near one of the corners of a passive rectangular area 11. This passive area 11 may be any selected rectangular area located above a flat surface of an object such as a table, tablet, board, wall, or located before a display device such as a computer monitor, laptop display, PDA device, projection screen, or a television screen display. An example of such attachment to a display device is shown in FIG. 1a.

An object 12 or plurality of objects such as a pen, a pointing stick, a light pen, a box, or a more complex curved object such as a different shaped containers or a human finger may be placed within this area 11. The device D finds the basic planetary coordinates of the object 12 and in some of the embodiments, its space coordinates and/or its projected surface curvature coordinates.

The simplest form of this invention is a device that can input two position coordinates (X, Y) into a computer system. One of the main usages of such a device is similar to that of known optical 'touch panel/screen' devices. Such two-coordinate systems will hereafter be referred to as 'two-coordinate' embodiments.

An example for a specific. use of such embodiments is the attachment of one of the 'two-coordinate' embodiments to a large screen display unit and converting part of the area of such display, near the attached device, to an optical touch screen device while displaying relevant images on this area. These images can be related to the touch screen functionality and be displayed at specific times, images such as a keyboard, menus or a computer desktop image.

A further developed form of this invention entails three-coordinate (X, Y, Z) measurements. Such embodiments will hereafter be referred to as 'three-coordinate' embodiments. The third coordinate (Z) is the height coordinate of an object above a flat surface. These Z-coordinate values may be used for many applications, for example, for getting the projected size and space location coordinates of a specific object 12, using a pointing object 12 similar to a 'touch screen' device with an ability to zoom into graphical applications such as maps. The three-coordinate extraction method may be extended further to include three-dimensional information (X, Y, Z) regarding any curved object placed before the device. This feature may be used in applications such as 'virtual keyboards' (FIG. 2), in which the location of human fingers can be recognized above printed or projected keyboards, or for applications such as object identification and space positioning for machine vision or robotics applications. Such embodiments will hereafter be referred to as 'surface-measurement' embodiments.

Moving object coordinates may also be extracted by using known techniques for picturing the object movement frame after frame. Multiple object coordinate extraction is also possible by using methods similar to the one-object methods; however, this patent application will focus on one object coordinate extraction.

The two-coordinate and three-coordinate embodiments refer mostly to rectangular measurement areas 11. Optical measurement methods are known in the art; the main advantage of some of the described embodiments is their enclosure in one unit and the use of minimal optical elements thus, increasing the simplicity of such devices. For 'touch-screen' pointing systems, the installation of the suggested devices D—attachment to the frame of monitor 11 as shown in FIG. 1a—is an easy process as compared to other known devices.

In accordance with a preferred embodiment of the present invention, unit D optically measures the location of object 12 in a wide angle with respect to unit D.

For all the embodiments, the basic method of calculating the coordinates of an object 12 is based on measurements from two points located on the same base line with a known length, and extracting the coordinates of object 12 by using triangulation method.

These coordinates may be calculated in software, or by using hardware that is pre-designed/programmed for this purpose. Such hardware may be part of the device D, external to the device D, integrated into computer hardware or into an electronic chip such as ASIC, PGA, FPGA, or integrated into the photo-sensing chip itself using technologies such as CMOS. The term 'program' will be used in this document as a general term for any type of data processing or calculating solution.

In all embodiments, the passive area/space of measurement 11 may be shaped in various geometrical shapes such as parallelogram, square, trapezoid, rectangle, cone, sphere, or cube, or as a portion of such shapes. The most practical geometrical shape for use as the passive area/space 11 is a rectangle, cube or cone; therefore this document will hereafter focus on such shapes.

Furthermore, for all embodiments, the passive measurement area/space 11 may not necessarily be located above a flat or otherwise shaped object surface and can be located in the space not related to any specific object; the only condition required is that a measured object placed in such area/space will have a 'line of sight' with the device. For simplicity this document will focus on a flat surface to specify the borders of such a measurement area or space 11.

The device D is basically constructed of lenses and photo-sensing elements, which vary in number and positioning according to the appropriate embodiment. Additional elements are added to this construction in several of the embodiments.

Although the term infrared (IR) light is mainly used in this document to describe the source light used in some of the preferred embodiments below, the present invention is not restricted to this light spectrum. Different light spectrum ranges emitted by light source/s or even ambient light may be used to operate the device. The ranges might include ultraviolate (UV) light, specific monochromatic color, or white light.

The light source, if present, the photo-sensing device D and, if needed, a light spectrum filter should all match the chosen light spectrum range.

For optimal results in object pointing applications, a narrow IR spectrum may be used. IR light is not visible and there is a relatively low level of ambient IR light in usual office/home environments. Also, IR illumination from a computer screen is not significant and while using a narrow spectrum IR filter that is matched to the IR source, there is a minimal chance of ambient light interference with the device operation. For the embodiments of surface-measurement, white light or ambient light may be the preferred spectrum.

For all embodiments, the light source, which projects light to the object 12, if present, must illuminate an object placed in any point of the measurement area/space 11. This light source may be included with the device D itself, separated from the device D, located within the object 12 itself or be placed in various points in space. In addition, a plurality of light sources may be placed in various locations and light reflective members might be used to reflect light from such light sources.

A variety of photo-sensing devices may be used with the present invention according to light sensitivity levels and/or various technologies such as photo diodes array, charged coupled device (CCD), CMOS and PCMOS-CCD.

Figure 2A:
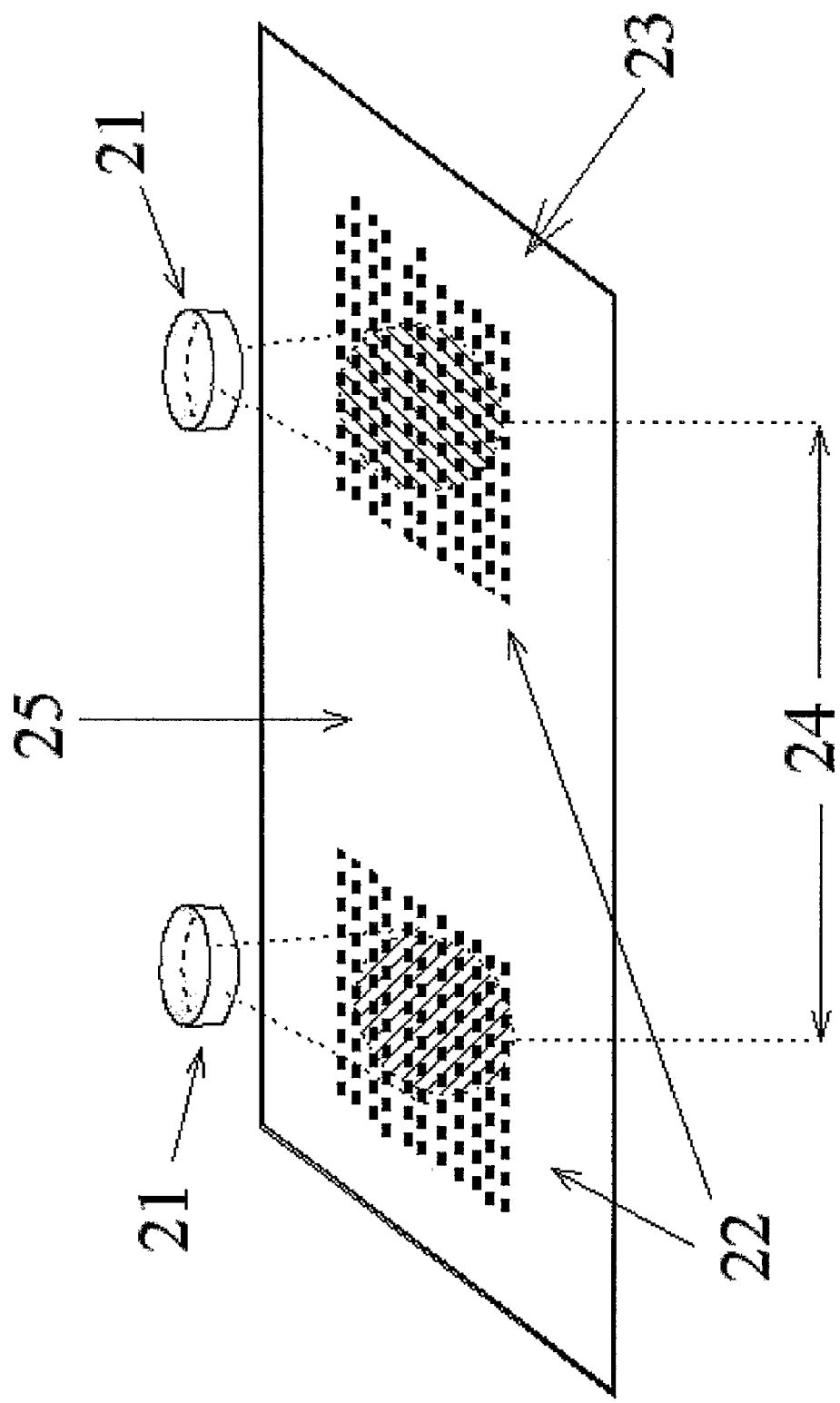
FIG. 2a is a summarized diagram showing a concept of an area array photo sensing device such as a CMOS, which includes two area photo sensitive arrays.
Figure 2B:
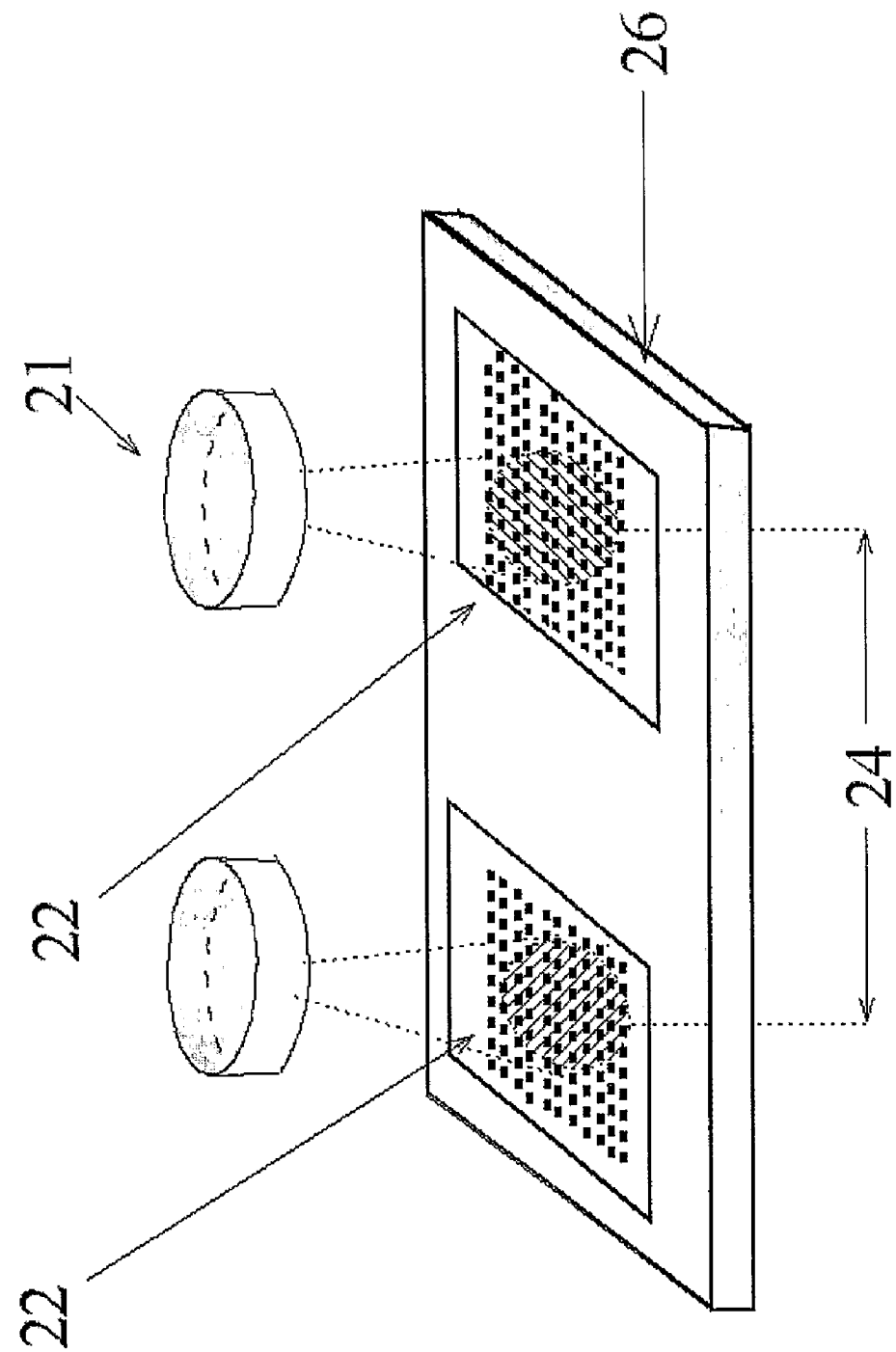
FIG. 2b is a summarized diagram showing a concept of two area photo sensing arrays that are packaged inside the same chip package.

The photo-sensing device may be a one-pixel line linear array or array that includes several multiple pixel lines. These types of photo-sensing arrays are typically used with CCD technology in scanners, fax machines or with military applications. A further option is to use an area/rectangular photo-sensing array. These are mostly in use with video/still digital cameras. Some other photo-sensing array types are used for airborne aerial photography, space exploration, etc. Various resolutions of photo-sensing arrays may also be used as required for specific application resolution. This document will focus on the use of one-line linear photo-sensing arrays. However, different types of pixel arrangements are possible, such as one or several broken pixel lines, different array geometrical shapes, a part or parts of such photo-sensing arrays, such photo-sensing arrays that are partly defective as a result of any manufacturing, handling or servicing process, and/or two or more photo-sensitive areas as described in FIG. 2a. This embodiment makes use of the ability to design custom CMOS devices 23 and create two separated photo-sensing areas 22 on the same substrate. As described below, most of the embodiments make use of a 'base line' 24 that is created while placing lenses 21 above such photo-sensing devices 22. By designing a CMOS chip 23 in such a way that the two light-sensitive areas 22 are placed far apart from each other, higher measurement accuracy can be achieved. The middle area 25 that is not a 'photo-active' area may be used for electronic circuitry for various functions. Another example is described in FIG. 2b where two photosensitive arrays 22 are enclosed under one chip package 26.

The computer program should be designed in a way that will consider the specific designed application of the device D and the technology, type, shapes and/or the number of pixels of such photosensitive arrays 22. Such a program may include steps for eliminating defective pixels from its calculations. This elimination process may involve using known averaging techniques from video or still digital camera applications or by designing a specific application in which the location of such pixels will not affect the use of the specific designed application.

It is important to note that in the present invention it is always possible to use an area photo-sensing array in place of a linear photo-sensing array 22 by using only one line of pixels in order to determine coordinates.

Also, the described invention in all of its embodiments may be integrated partly into an electronic chip with technologies that have a photo-sensing device as part of their functionality. These devices might include an additional circuitry in order to perform functions over the basic image capturing functions. One example of such technology is the light sensing CMOS technology that enables integrating on one chip electronic circuitry for pixel distance measurement function based on time of flight (TOF) as described in U.S. Pat. No. 6,522,395.

In relation to the discussion of photo-sensing devices above and in order to simplify, the term CCD will hereafter refer to any photo-sensing element.

Various types of lenses 21 may also be used in the construction of the present invention. The term "lens" will hereafter refer to any type of lens construction that may include a number of combined lenses from various elements such as spherical, cylindrical or toroidal of various shapes such as ball, plano-convex, double convex, or achromatic; these lenses might be also constructed from different materials.

The lenses 21 and the CCD should be aligned in a way such that the image of an object 12, placed in various locations within the measurement plane/space 11, is projected into the active area of such CCD. The distance of the CCD from the lenses 21 should be optimized in order to have a reasonable focused image of nearby objects and far objects. This distance will be discussed further for specific suggested embodiments.

Throughout this document, the term 'X-Y plane' will denote the measurement plane of the two-coordinate embodiments and the 'Z-axis' will denote the axis orthogonal to such an X-Y plane.

In the first and most basic two-coordinate 'X-Y plane' embodiment of the present invention, two linear CCDs 32a or one long linear CCD 32b, are placed inside a closed opaque box, which is not exposed to any ambient light (FIG. 3).

Examples of such linear CCDs 32 that may be used are: an IR type CCD TH7815 or long IR CCD TH7834C from Atmel Corporation, San Jose, Calif., USA, a black and white CCD such as ILX531A or a color CCD such as ELX718K from Sony Corporation.

Two lenses 21 are placed in front of the CCD/s 32. These lenses 21 may be designed in a specific shape or diameter in order to increase the amount of light projected onto the CCD/s 32 as well as the image quality In all embodiments of the present invention, the lenses 21 that are part of the lens pairs used to measure the distance to object 12, are positioned as far as possible from each other, to create a long base line 24, which enables accurate trigonometric calculation when deriving the coordinates of object 12. A light source 31 may be placed in order to illuminate the object while a matched spectrum light filter 33 may be placed in front the lenses.

The operation of these devices is as follows: images of the objects 12 are projected on the CCD 32 surface and translated by the CCD 32 to electrical signals. These are fed into an electronic circuit that feeds a computer program. In order to find the coordinates, the computer program relies on comparisons between the two images viewed from different angles. Object coordinates are extracted by using triangulation computations.

Figure 3A:
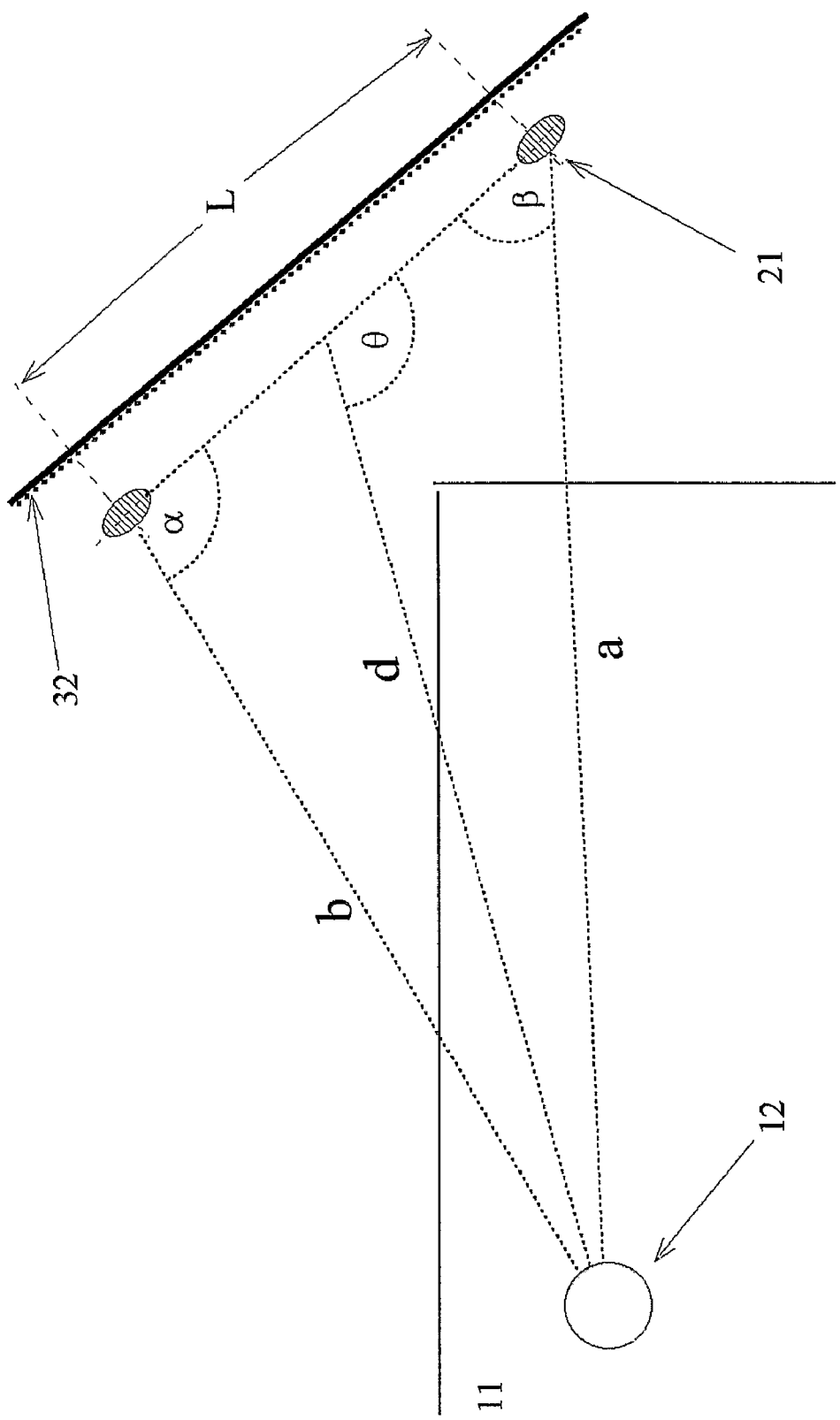
FIG. 3a illustrates trigonometric calculations for the arrangement of the right side of FIG. 3.

Angles $\alpha$ and $\beta$ in FIG. 3a are found form the locations of the images of the measured object captured on the active surface of the CCD. The coordinates of the object can be extracted using triangulation in various ways. An example of such calculation which uses a polar coordinate system is presented here. The polar coordinates can be transformed to a rectangular coordinate system as necessary.

The letter d in FIG. 3a denote the distance of the measured object 12 from the device, and $\theta$ will denote the angle of the object in relation to the device, the position of both d and $\theta$ will be measured by using the known length of base line L.

Length d will be calculated as an average of the lengths a and b, $\theta$ will be calculated as an averages of $\alpha$ and $(180-\beta)$ thus, $$\theta = \frac{\alpha - \beta}{2} + 90.$$

The lengths a and b are calculated as follows:

It is known that from trigonometric theory that:

$$\frac{a}{\sin\alpha} = \frac{b}{\sin\beta} = \frac{L}{\sin(180 - (\alpha + \beta))},$$

and b can be extracted by the following formulas:

$$a = \frac{L\sin\alpha}{\sin(\alpha + \beta)} \quad b = \frac{L\sin\beta}{\sin(\alpha + \beta)}$$

As mentioned above, d is calculated as the average of a and b, and thus $$d = \frac{L(\sin\alpha + \sin\beta)}{2\sin(\alpha + \beta)}$$

In order to transform these polar coordinates (d;θ) to rectangular coordinates (x; y) the following equations should be used:

x=d cos θ y=d sin θ

As mentioned above, the embodiments may be built by using different types of lenses 21. For example, FIG. 4 shows a top view and a side view of a spherical lens configuration, two spherical lenses 21 are placed in front of the CCD 32. One or more light sources 31, which may be placed on the device D, illuminate the space surrounding the measurement plane with invisible IR light.

In this configuration, the images of the object 12 fall on a pixel line (or multi-line) 42 of CCD 32 while the object 12 is placed below the optical axis 41 of the lens.

Figure 5:
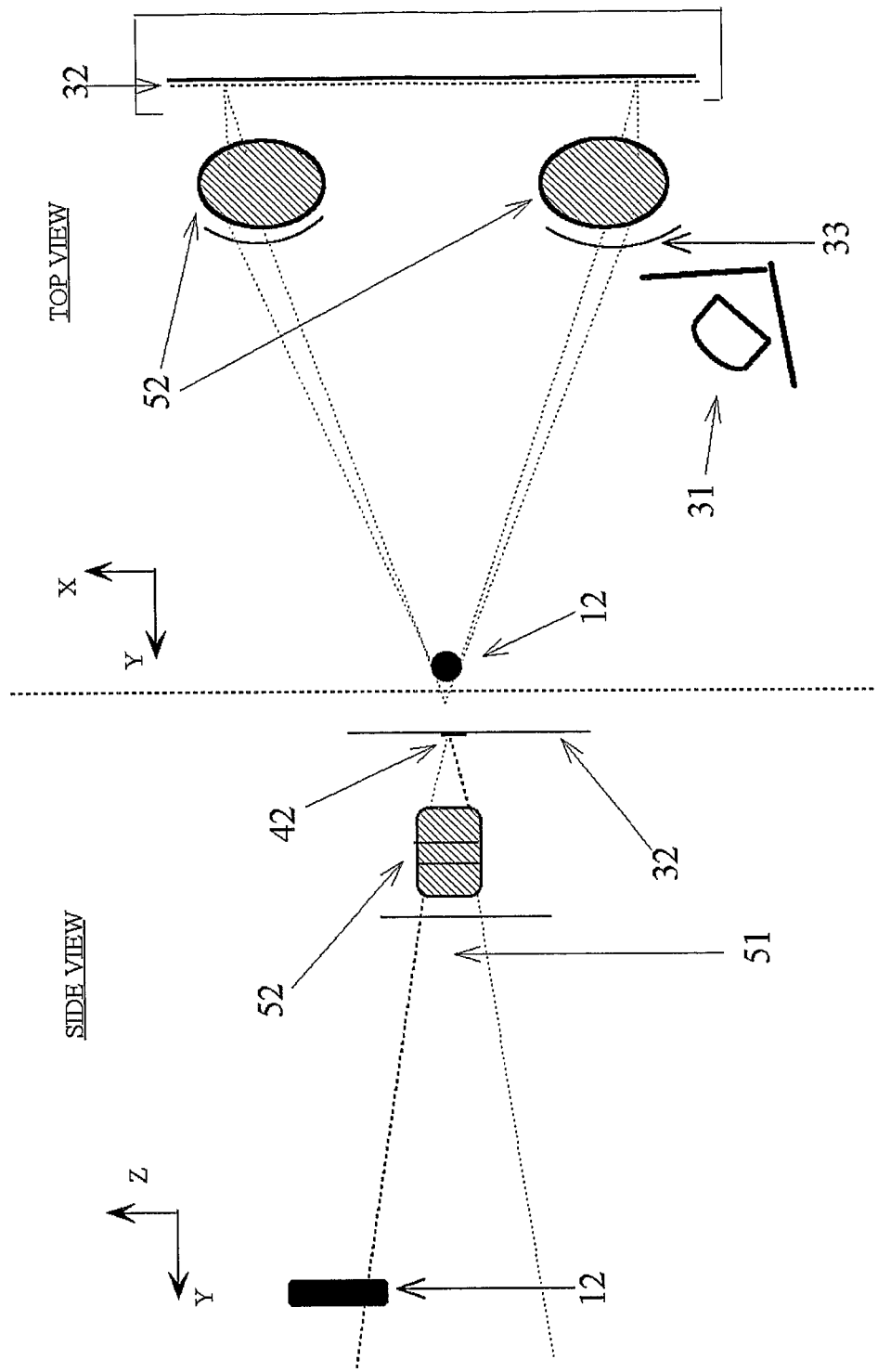
FIG. 5 is a summarized diagram showing at the right side a top view and at the left side a side view of one photo sensing device with two cylindrical lenses placed in front of the photo sensing device.

Another example entails the use of cylindrical lenses 52; this configuration is shown in FIG. 5. In this configuration, the images of the object 12 fall on the pixel line 42 of CCD 32 while the object 12 is placed within a conic space 51. The measurement area should be inside this illuminated space 51 and may be positioned above a flat surface as described above. The lenses 52 should project the scattered IR light into the CCD 32 from an object 12 placed within this measurement area 11. The scattered light from the object 12 passes through an IR filter 33.

The light sources 31 may be driven with high current pulses in order to achieve the required intensity level. These pulses should be synchronized with the sampling rate of the CCD 32 in a way that will enable getting the necessary image patterns on the CCD 32.

Figure 6:
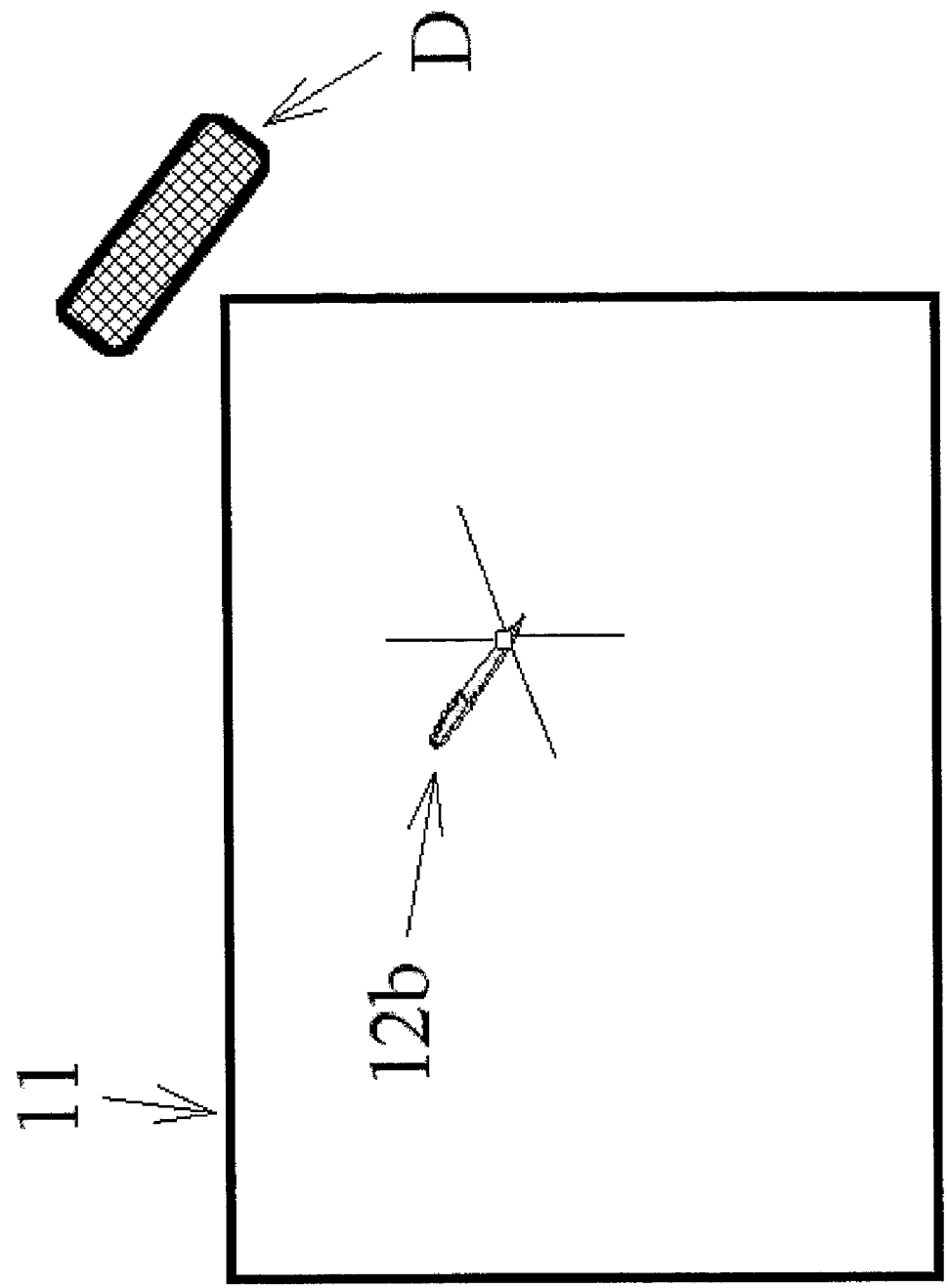
FIG. 6 is a summarized diagram showing a top view of coordinate measurement device with a lighted pen as a pointing device.

According to an additional embodiment of the present invention, the device is designed to operate with an object 12b that emits light directly towards the device D, as described in FIG. 6. Such an object 12b may be a pen with an IR light source operated by a battery. This may be used as an alternative to another light source. When using such a lighted object 12b, the direct light of such object would project on the CCD 32 similar to the way scattered light would be projected.

Figure 7:
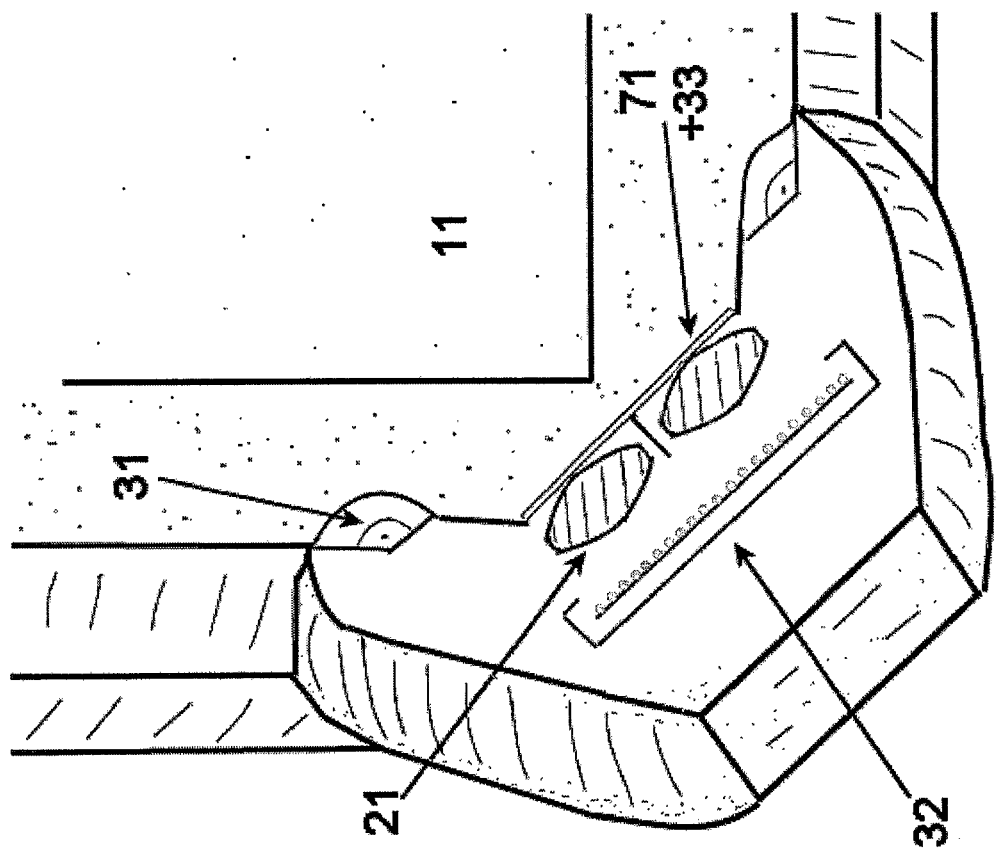
FIG. 7 is a perspective view showing an optical measurement unit inner general arrangement of optical elements.

A further configuration of the present invention is described in FIG. 7. Here, only one linear CCD 32 is used and two opto-electronic shutters 71 are located in front of the lenses 21. The angle of the CCD pixel line 32 in relation to the horizontal axis of measurement plane 11 should be in a range around 45 degrees.

A variety of electronic light shutters, such as liquid crystal device (LCD) blockers or such devices based on magneto-optic effects, may be used. However, the terms LCD shutter or LCD blocker will hereafter refer to all types of opto-electronic shutters.

The designer may use LCD shutters such as 'custom liquid crystal shutters' from CRL Opto Limited, Dalgety Bay, Dunfermline, Scotland.

The shutters 71 are opened and closed sequentially in a way that at any given time only one lens 21 is opened while the other lens 21 is closed. The computer program will activate each shutter to block each lens separately at specific timing, and the CCD 32 will receive separate images. Each separate image may be stored in an electronic memory for required processing.

The IR filters 33 are placed over both lenses. The device D includes an infrared light source 31 emitting light in a manner similar to the first embodiment.

The methods of finding the coordinates of an object are similar to the methods described for the embodiments above. However, in this embodiment, only one relatively short CCD 32 is used, but the alternating shutters 71 provide different images to the CCD 32. These images are the measured object 12 images in which it is viewed from different angles within very short periods of time, thus the coordinates are found in similar ways to the first embodiment, using the triangulation method.

The embodiments described above are appropriate and provide accurate results for measuring the coordinates in most of the measurement plane area 11. However, a problem may arise when measuring the distance to the object 12 when it is positioned relatively far from the device D, since the light scattered to the lenses is insufficient and the coordinates cannot be measured accurately. This problem may be less severe when using bright colors on the measured object surface 11 or while using configurations in which the light source is emitted from object 12 itself, as described in FIG. 6.

Another solution is to use CCDs with a larger pixel size. Such CCDs will receive more light per pixel, thus increasing the signal to noise ratio. In order to achieve high resolution of the device and at the same time increase the pixel area exposed to light, it is preferred to use long rectangular pixel CCDs.

Another possible option is to use a CCD with multiple parallel pixel lines such as in RGB color CCD. By electronically summing the output of all pixel lines to the resolution line, a similar effect such as that of larger pixels may be achieved. It is possible to use common visible light RGB color linear CCD, while using IR light source, when all three-color channels pixel lines of the CCD have a reasonable IR spectrum response.

Another problem may arise when the device D is positioned at a very short distance from the edges of the measurement plane 11. In such cases, relatively large viewing angles are created when an object 12 is located in large angles from the lenses' optical axes, (i.e. angles larger than approximately 25 degrees). This problem is due to a known lens phenomenon such as lens astigmatism and other types of lens aberrations. Such sensitive regions are sections A & B in FIG. 8.

These phenomena cause difficulties in finding accurate coordinates, and may reduce image sharpness. Usually at these large angles the shape of the projected image on the CCD 32 will be distorted. These phenomena will reduce the received device resolution (relative to the general possible device resolution of the measurement plane at smaller angels) when the measured object 12 is placed in such large angles.

These problems may be solved in various ways. It is possible to use the device with a lower resolution in the problematic wide-angle areas. This solution will suffice for certain applications or uses that do not require a high resolution on the problematic areas. In addition, the device may be tilted in order to obtain higher resolution in a specific area on the account of other measurement area section.

Figure 9:
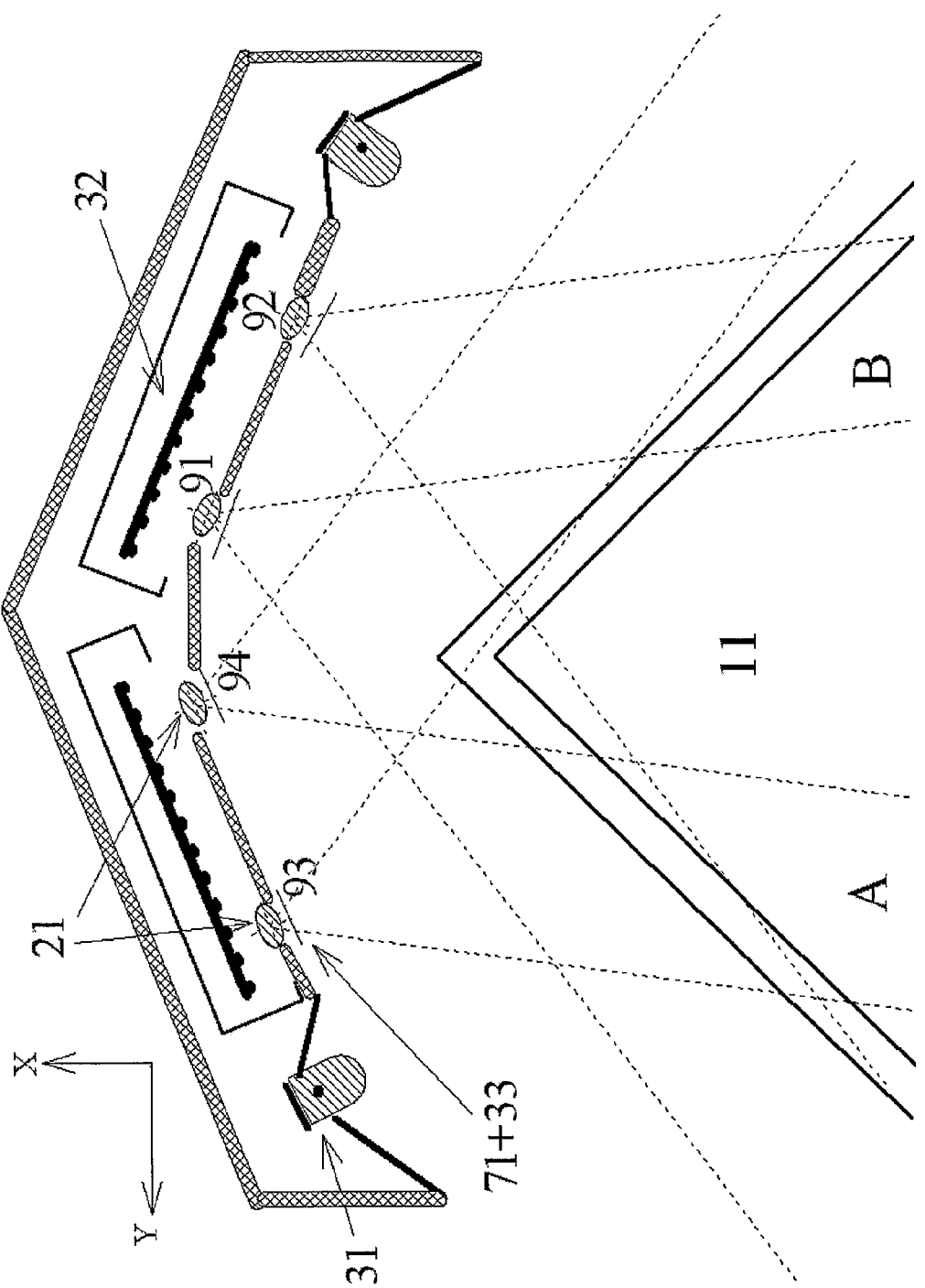
FIG. 9 is a summarized diagram showing a top view of a coordinate measurement device containing two photo sensing devices wherein two lenses placed in front of each photo sensing device.

As an additional solution to this problem, the device D may be attached to the corner of measuring area 11 with additional distance from the corner. This will lower the viewing angles and thus, increase the accuracy of the device in the problematic A further option is to enhance the previously described embodiments by using two CCDs 32 that will be placed in different angles facing the measurement plane 11. One arrangement that achieves this is shown in FIG. 9.

Figure 10:
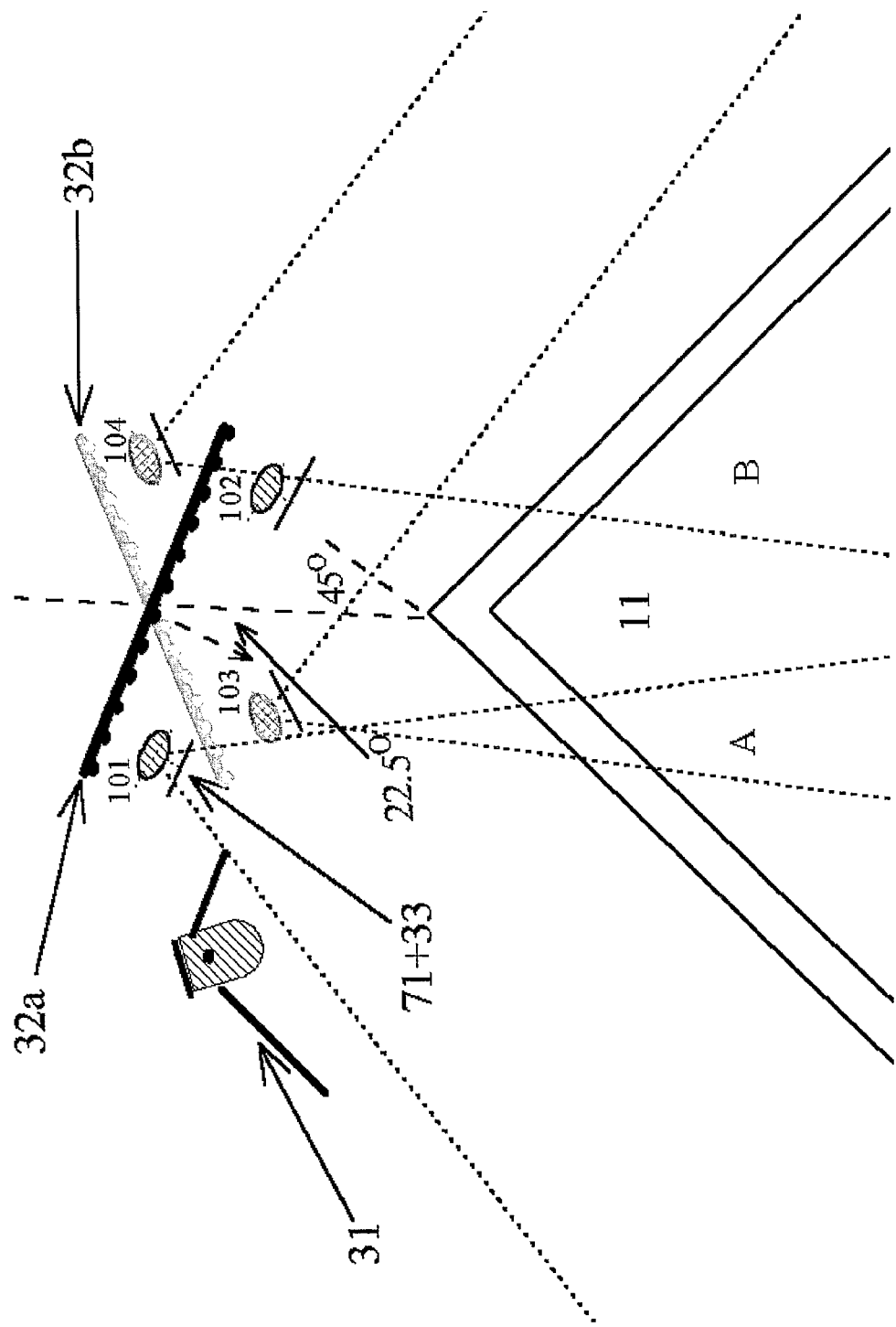
FIG. 10 is a summarized diagram showing a top view of a coordinate measurement device containing two photo sensing devices wherein two lenses placed in front of each photo sensing device while one photo sensing device is placed on top of the other.

In this arrangement, one CCD 32 is placed with an angle of approximately 22.5 degrees between the CCD's pixel line to the horizontal border of the measurement area 11. The other CCD 32 is placed at approximately 67.5 degrees in order to create about 135 degrees between the CCDs. These CCDs 32 may be placed side by side as shown above, or one above the other as shown in FIG. 10.

In this embodiment, two lenses 21 are placed in front of each CCD 32 (101, 102 for one CCD and 103, 104 for the other CCD) where the lenses' 21 planes are parallel to their respective pixel lines of both CCDs 32. For each CCD 32, the operation of the device is similar to that of the previous embodiments. In front of each lens 21 are an LCD shutter 71 and an IR filter 33. Each CCD 32 may receive images from an object 12 placed in various locations on the measurement plane 11. However, the quality of the images is improved at the problematic areas A, B to which the specific CCD 32 is aligned. Thus, a high resolution can be achieved throughout the measurement plane 11.

To determine a specific location of an object 12, the main program will need to evaluate both images. The program can detect the better quality CCD 32 image by known geometrical and/or statistical methods. An example of such a geometrical method is first detecting the general section that the image falls on and then choosing the specific CCD by the location of that specific section. An example for such a statistical method is to find the standard deviations of the images' intensities and to choose the CCD with the smallest standard deviation.

Figure 8:
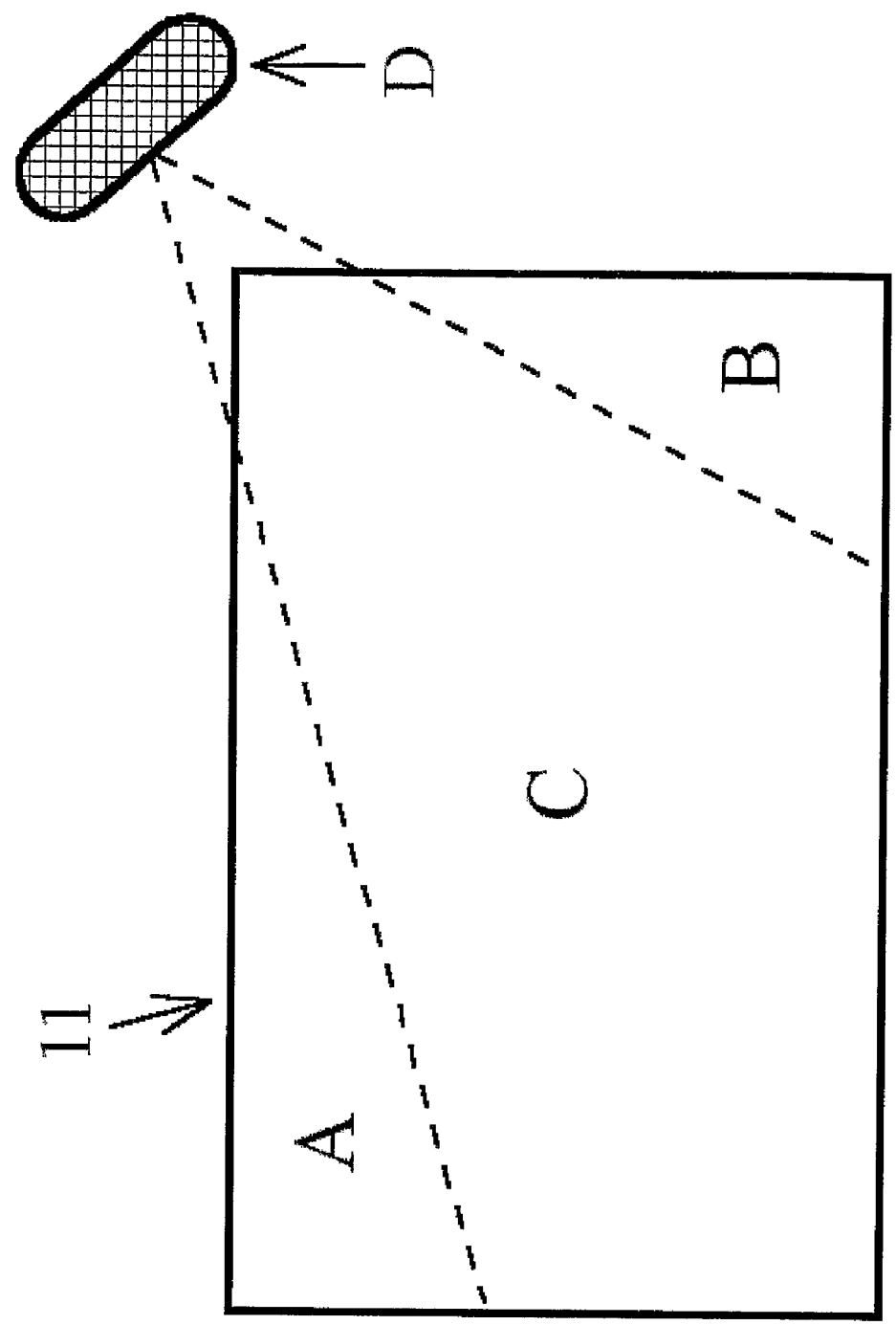
FIG. 8 is a summarized diagram showing a top view of a coordinate measurement device and various sections of a measurement plane.

The middle section of the measurement plane C in FIG. 8 is covered by both CCDs 32 and thus, the program may be written in such a way that will prefer one CCD 32 over the other when the object 12 is placed on the middle area.

Figure 11:
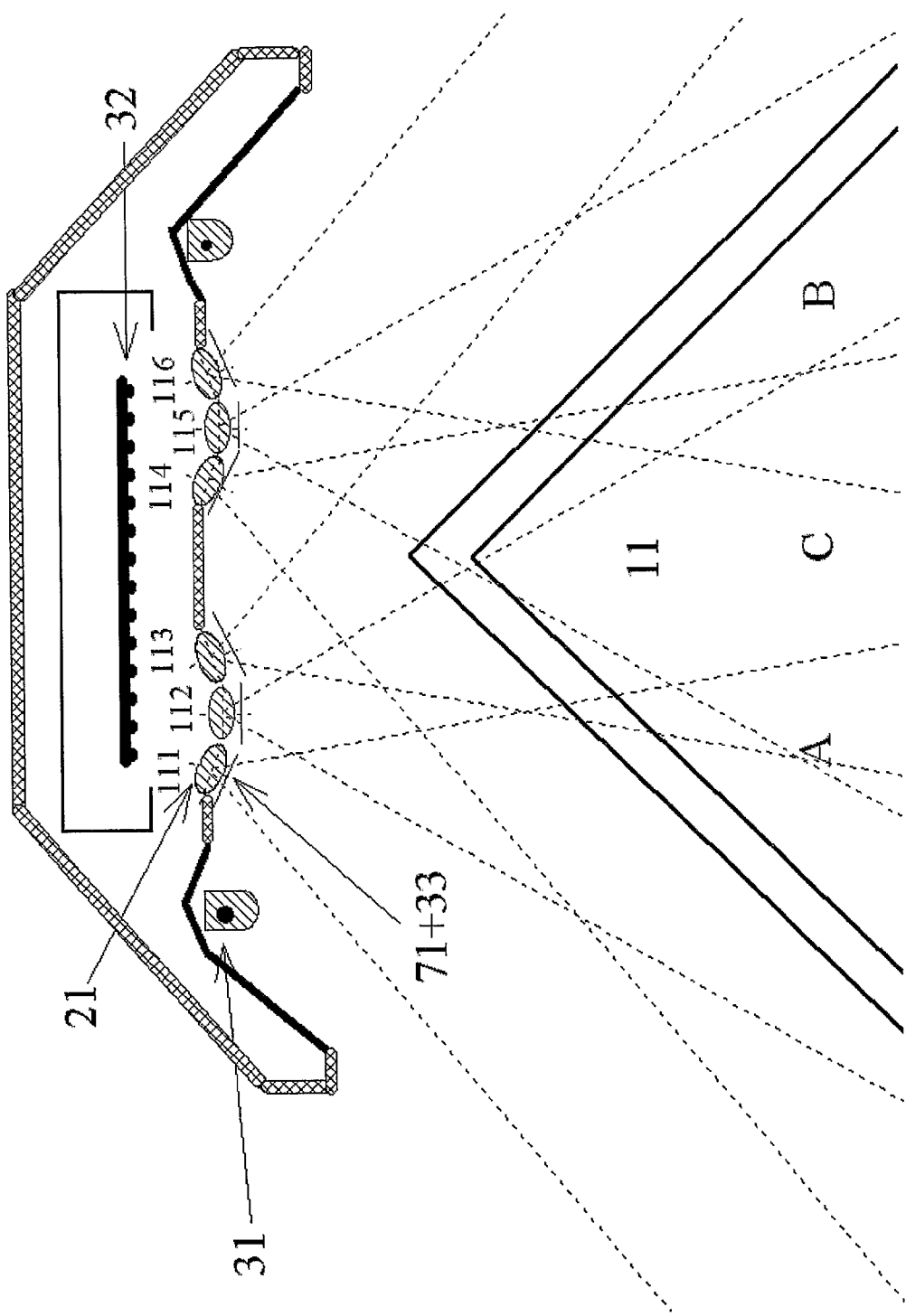
FIG. 11 is a summarized diagram showing a top view of a coordinate measurement device containing one photo sensing device with six lenses placed in front of the photo sensing device while each pair of lenses faces a different direction.

A fourth option for solving the wide-angle problem is to use a configuration of one CCD 32 with multiple lenses, as shown in FIG. 11. Although this configuration will be described as a six-lens and one CCD configuration, any even number of lenses (beginning at four) or any number of CCDs may be used.

In this arrangement, each lens 21 in a pair of lenses is tilted with the same angle in relation to the CCD and is placed as far as possible from the other lens to enable as accurate trigonometric calculation as possible. The length of the base line 24 between the lenses in such a pair is equal in all three lens-pairs. Two of the lenses 112, 115 are placed with their planes in parallel to one of the pixel lines of CCD 32. These two lenses 112, 115 will function as in all above embodiments and will cover a large section of the middle measurement area C.

The other two pairs of lens 111, 114 and 113, 116 are tilted in order to get better image quality from the problematic sections (A and B in FIG. 8). One pair (111, 114) is tilted towards section A and the other pair (113, 116) is tilted towards section B. The lenses 21 are placed at a distance from the CCD 32 in a manner such that image will be near focus for an object 12 located in one of the locations in the far range of the problematic areas A,B. This will ensure better quality images to be used for higher-resolution in the problematic areas.

Figure 12:
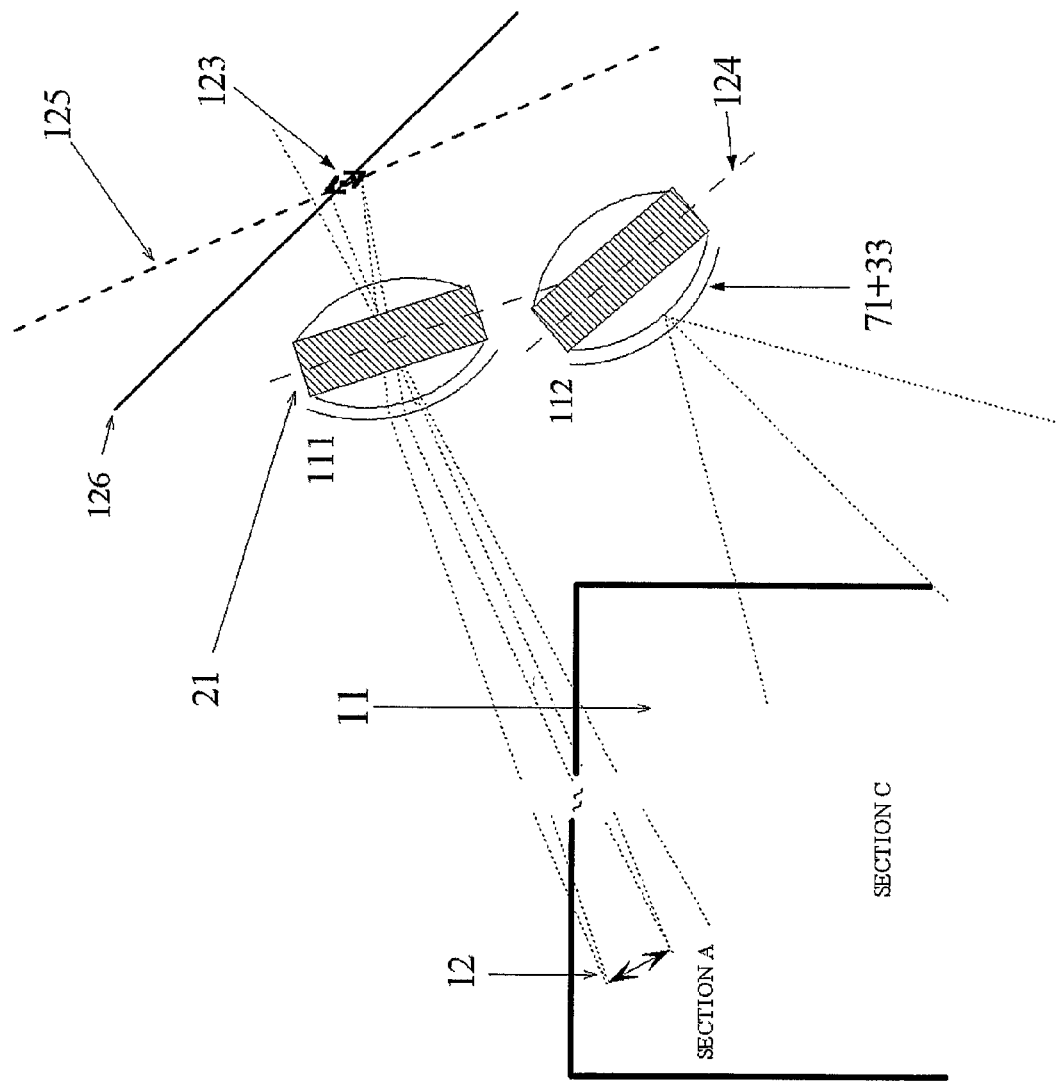
FIG. 12 is a summarized diagram showing close details of a top view of a coordinate measurement device shown in FIG. 11 while showing details of placement of lenses relative to the photo sensing device.

Details of this design are shown in FIG. 12 in a closer look into the placement of lenses 111 and 112. Here, CCD pixel line 126 is aligned to be parallel with the lens plane 124 of lens 112. Lens 112 is placed in such a way that the image of an object placed within section C will be near focus at point 123. 125 is the imaginary near focus plane for lens 111 for objects 12 placed within section A. Lens 111 is placed in such a way that its imaginary focus plane 125 will cross the actual pixel line at the same point 123. This arrangement will enable capturing near focus images for both sections A and B.

For the highest possible device resolution for a specific configuration, the angle tilt of these lenses 21 and the optimal distance of the CCD 32 from the lenses 21 can be found by running optical simulation software and studying the quality of the image falling on the CCD 32.

Each of the six lenses 111-116 in this configuration has an LCD light blocker 71 and an IR filter 33 in front it. While closing and opening the shutters 71 in a manner such that only one image is received by the CCD 32 at one time, the computer program will choose the best image quality between the three pairs of images that are acquired by the CCD 32. Next, the computer program calculates the coordinates while using similar methods as described in the above embodiments.

Figure 13:
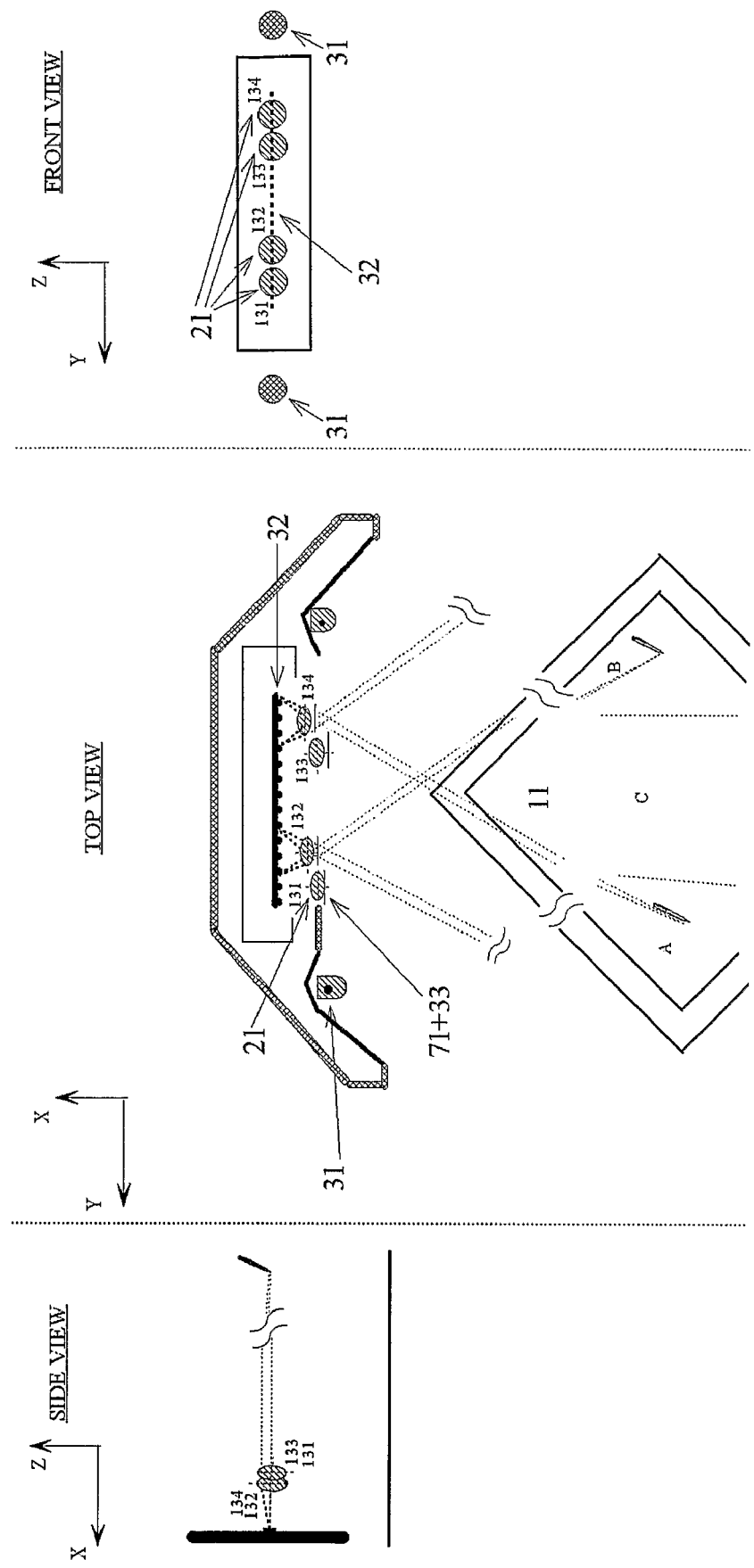
FIG. 13 is a summarized diagram showing front view, top view and side view of a coordinate measurement device containing one photo sensing device with four lenses placed in front of the photo sensing device while each pair of lenses is placed in different distance from the photo sensing device.

A fifth option for solving the wide-angle problem, as shown in FIG. 13, involves placing all lenses 21 with their planes parallel to the pixel line of the CCD 32. This configuration will be discussed herein with four lenses; however, any even number of lenses larger than or equal to four may be used.

This arrangement makes use of symmetry properties. Lenses 131 and 133 are used for the main section C, and are placed in such a way such that the image is near focus for the central section C. For sections A and B, lenses 132 and 134 are used.

The wide angles of section A and B will cause some astigmatism that will affect the images that fall on the CCD 32. These aberrations will have less of an effect if the images for wide angles are focused on the CCD 32. Lenses 132 and 134 are placed in such a way that the images on the CCD 32 will be near focus (highest light density per area unit) for one of the sections (A or B); however, because of symmetry, when an image is near focus for one of these sections it will also be near focus while an object is placed on it's twin section (B or A).

The two basic configurations described above that reduce wide-angle aberration effects can be integrated into a configuration that includes two or more units attached to the corners of measurement area 11. The basic method of such two-unit system is described in U.S. Pat. No. 4,782,328 and U.S. Pat. No. 6,421,042. By using these suggested wide angle coordinate measurement options one can reduce the distance of the units placement from the corners of the measured area 11, which will save the total space needed for such two unit system to operate.

Figure 14:
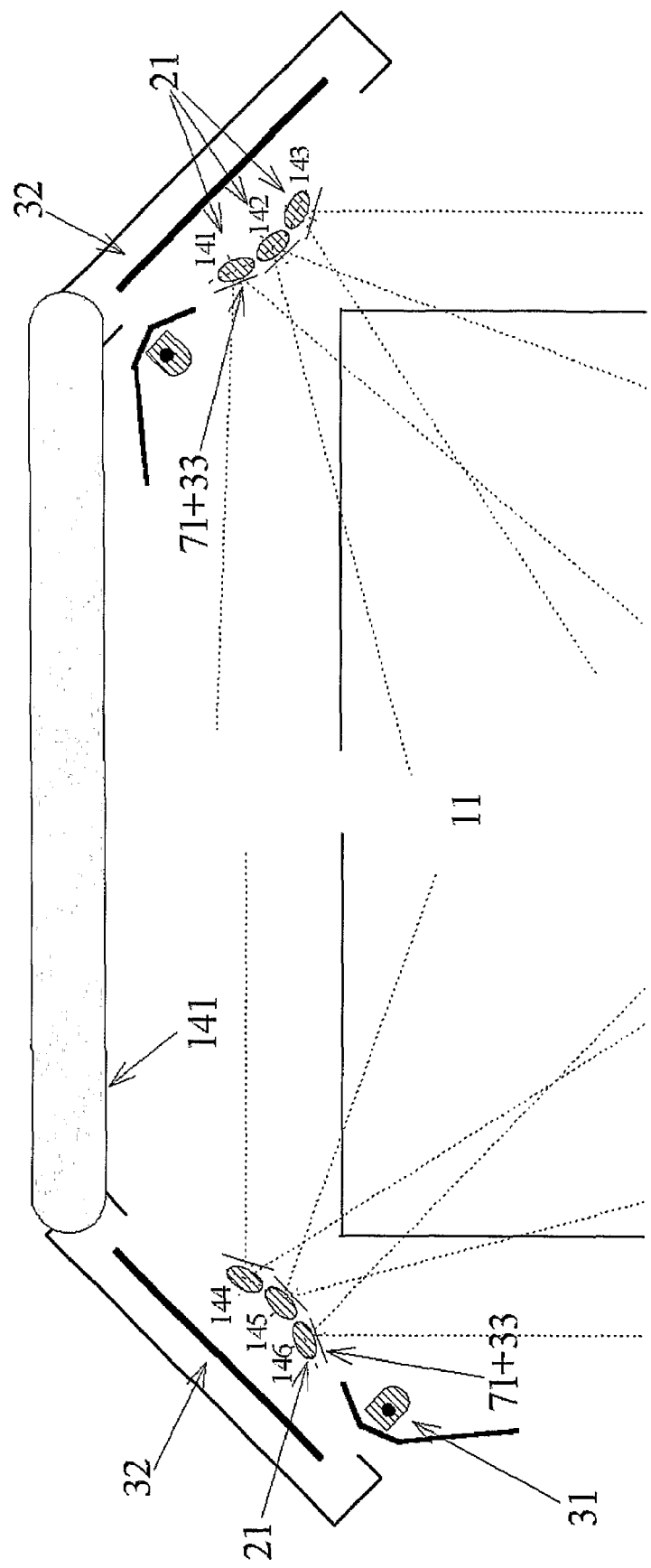
FIG. 14 is a summarized diagram showing a top view of a coordinate measurement system containing two units each contains one photo sensing device and three lenses placed in front of each photo sensing device while each lens faces a different section of the measurement plane.

In this embodiment multiple lenses 21 are placed in front of each CCD 32 in each unit (FIG. 14). These two units may be physically attached to each other in order to create an accurate base line, or may be separated, while the distances between the units will be known at the time of measurement and will be used for triangulation by the program. The arrangement in FIG. 14 makes use of two CCDs 32 at two corners of measurement area 11. Each lens is directed to a specific section of the area 11. Each lens 21 is placed in a similar manner to that described in the previous embodiments in order to get a near focus image for its specific section. The main program will work in a similar way as in the previous configuration in order to determine the best quality image.

Figure 15:
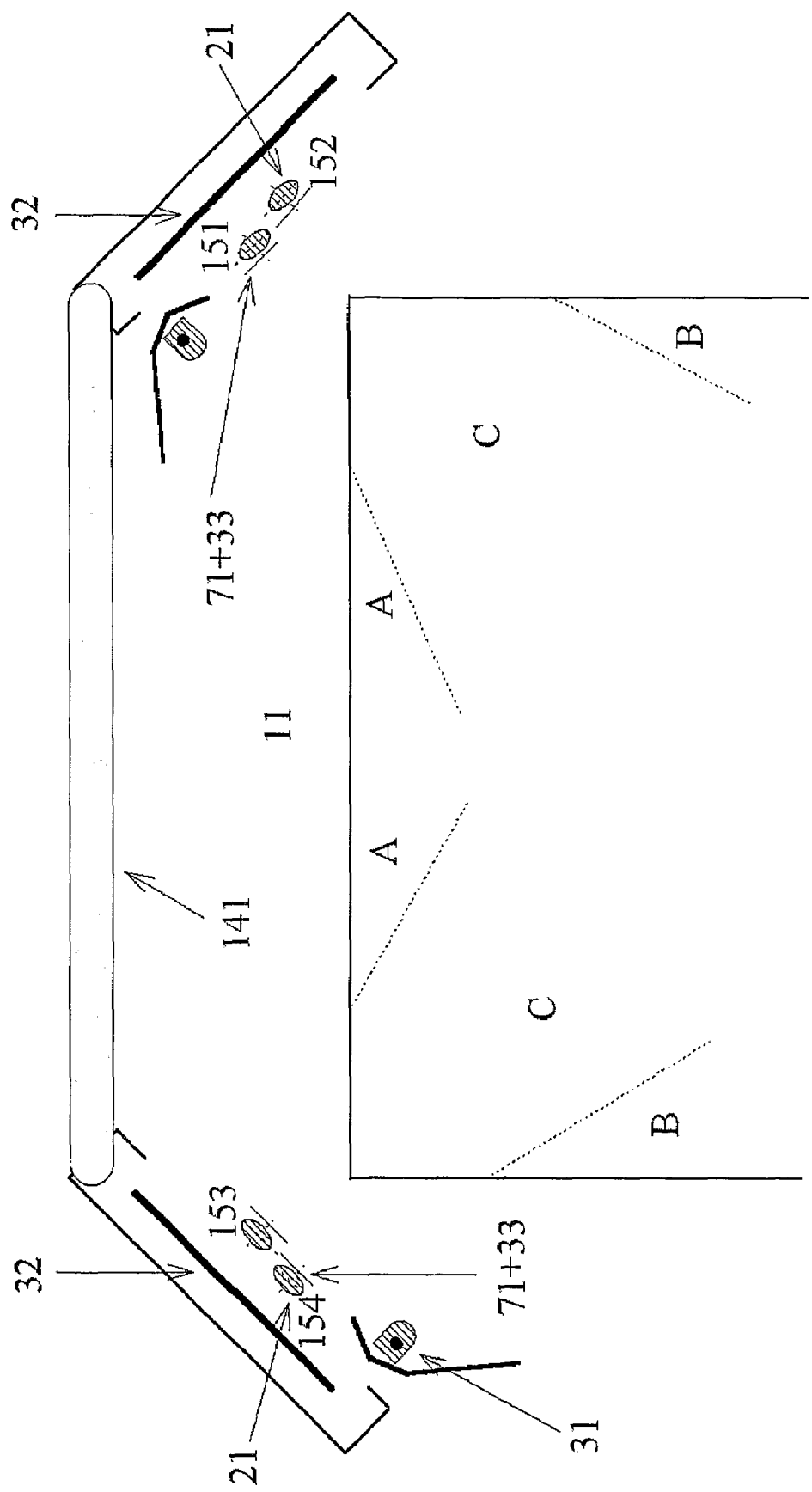
FIG. 15 is a summarized diagram showing a top view of a coordinate measurement system containing two units placed on different sides of a measurement plane; each such unit contains one photo sensing device and two lenses placed in front of each photo sensing device while each pair of lenses is positioned at a different distance from the photo sensing device.

Anther similar two-unit configuration (FIG. 15) is a configuration that makes use of the symmetry property as described above (FIG. 13). Here, four lenses 151-154 and two units are used. One pair of lenses (such as lenses 151 and 153) is placed in a way such that for an object 12 placed on the central section C, the images received on the CCD 32 would be near focus. The other pair (lenses 152 and 154) is aligned to be near focus for an object placed on one of the 'wide-angle' sections A or B. The other 'wide-angle' section (B or A) will also be in focus due to the symmetry property.

Figure 15A:
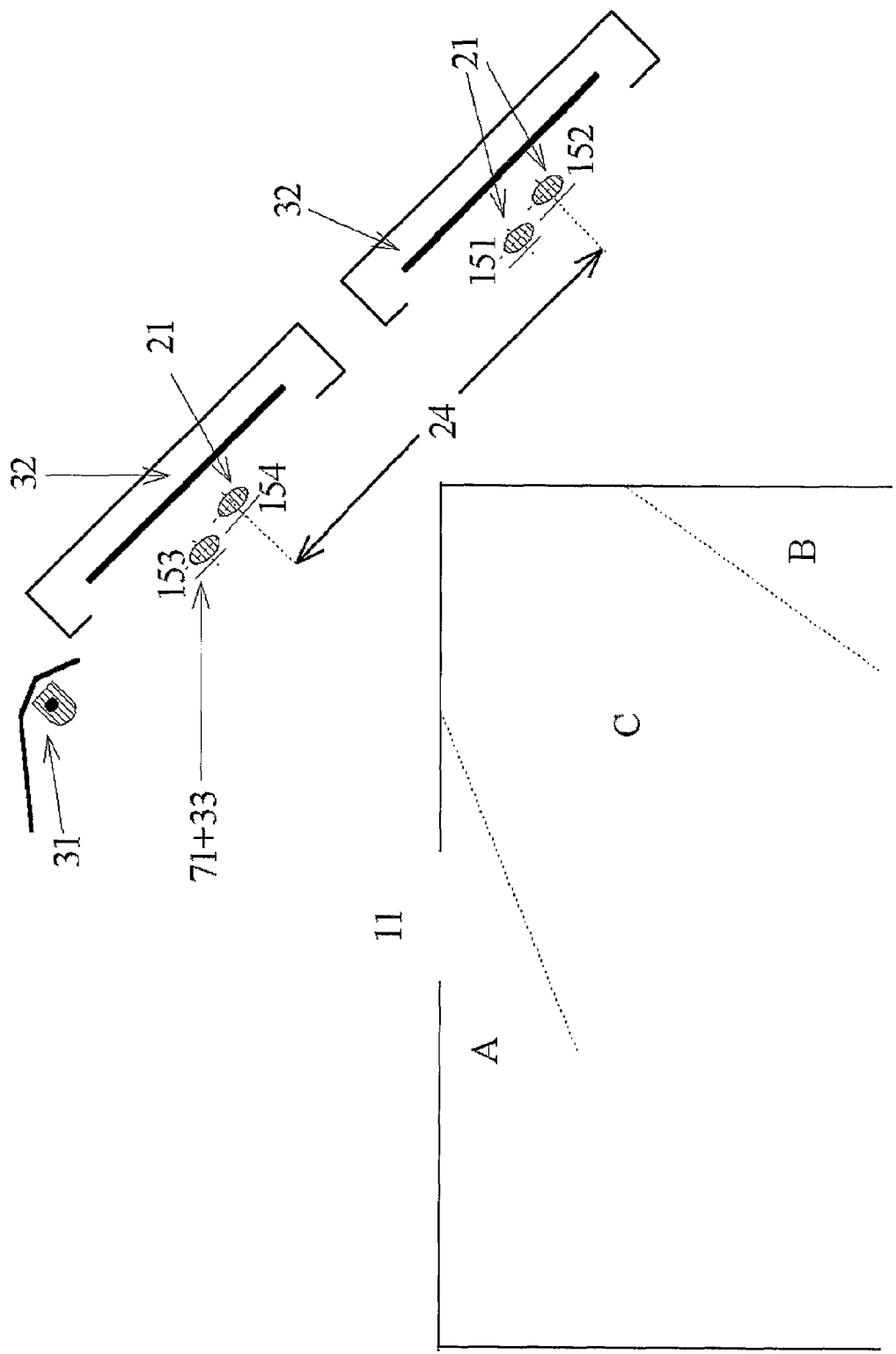
FIG. 15a is a summarized diagram showing a top view of a coordinate measurement device containing one unit placed on the corner of a measurement plane; the unit contains two photo sensing devices and two lenses placed in front of each photo sensing device while each pair of lenses is positioned at a different distance from the photo sensing device.

The same principles can be implemented while one unit containing two CCDs is placed on one of the corners of the measurement plane as described in FIG. 15a. Lenses 154 and 152 will be used for sections A and B and the pair of 153 and 151 will be used for the central section C.

Figure 15B:
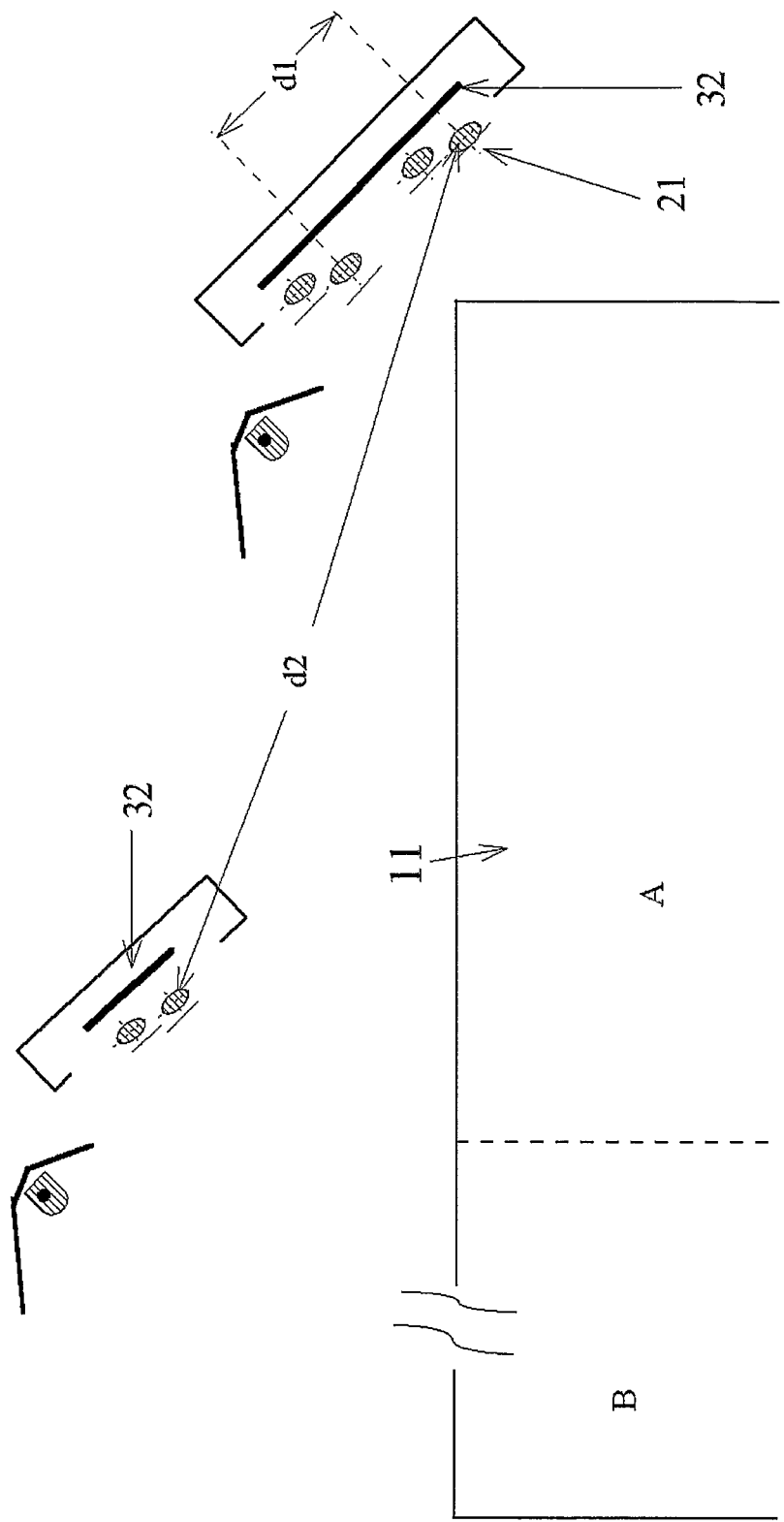
FIG. 15b is a summarized diagram showing a top view of a coordinate measurement system containing two units placed on the same side of a measurement plane; each such unit contains one photo sensing device either two or four lenses placed in front of each photo sensing device while lenses are positioned at various distances from the photo sensing device.

Additional configurations are possible by placing various length CCDs within various locations around the measurement area in order to get the necessary resolution at specific sections of the measured area. See FIG. 15b for example.

Here base line d1 is used for measurements of objects placed within area A and base line d2 is used for measurement of objects placed within area B. For all the embodiments in this document, there are two basic methods that may be implemented in order to reduce one or several of the device shutters. The first of such methods entails designing the device configuration with only one lens 21d covered by a shutter 71 (see FIG. 16). The other lens 21c, out of a pair of lenses placed in close proximity, will be constantly left open; both lenses may be covered with filters 33. The image 161 from the open lens 21c will be projected constantly into the CCD 32. An example of an analysis process for this method is described below.

At the time when an object 12 is placed on the measurement plane 11, the program closes the one shutter 71 blocking the light from its lens 21d from being projected into the CCD 32. Now the image projected on the CCD 32 active area is only the image 161 from the constantly open lens 21c. The program stores this image 161 pixel by pixel into an electronic memory (First image).

Next the program opens the other lens 21d. The pattern projected onto the CCD 32 is composed from both images 161, 162 projected partially one on top of the other. The program then stores this composed pattern pixel by pixel into another electronic memory. Next, the program electronically subtracts the pixel values of the first image 161 from the second pattern pixel values (composed of images 161 & 162). This subtraction operation is executed for each pixel separately; for a specific pixel address of the first image 161 & 162, the pixel located in the same exact CCD 32 address of the second image 161 is subtracted.

The result is then stored in a third electronic memory pixel by pixel. This result that is stored in the third memory is a representation of the image 162 that is projected only from the lens 21d with the electronic shutter 71. Thus, at the end of this process the program has two separated images 161, 162 of the object 12. As with the other embodiments described above, the program is able to use these two images 161, 162 in order find the object 12 coordinates.

Figure 17:
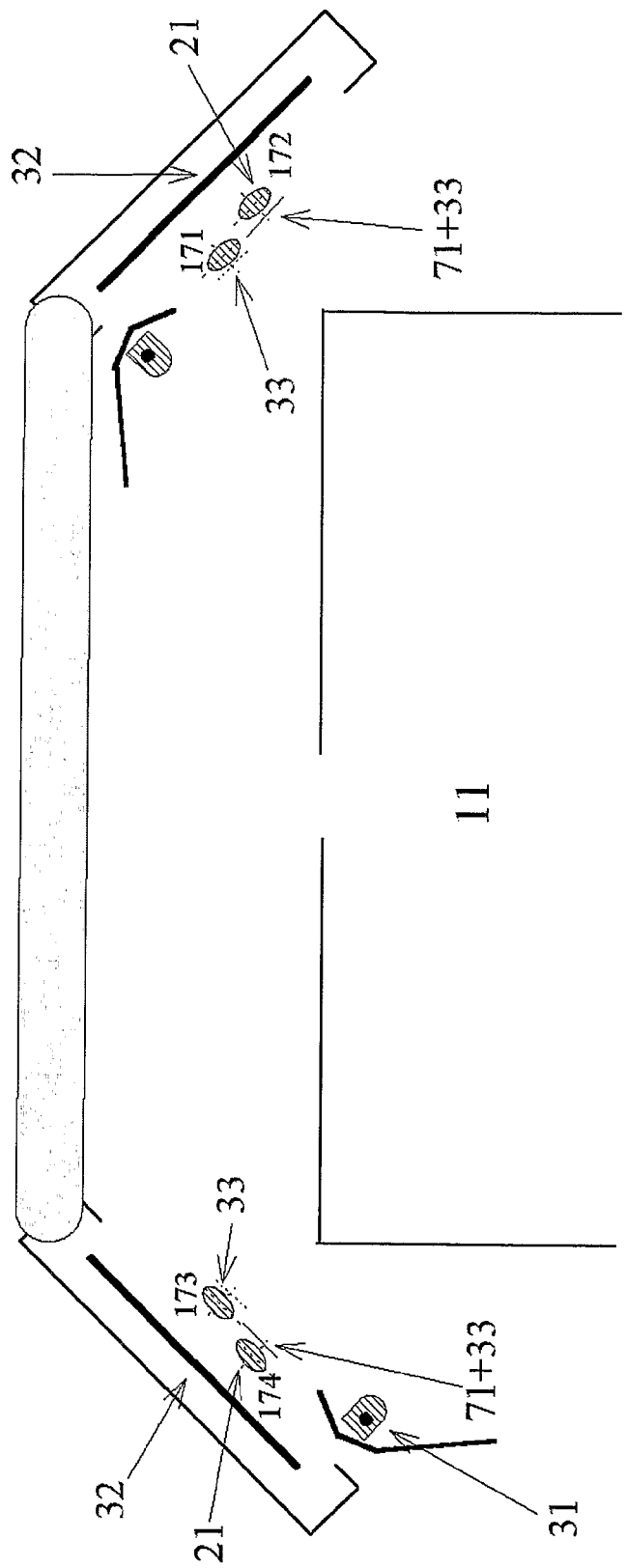
FIG. 17 is a summarized diagram showing the concept of elimination of shutters method as implemented in a two unit coordinate measurement system.

This first method of reduction of the number of shutters can be implemented into the various embodiment configurations described above. For example, an embodiment with two units is shown in FIG. 17. In this configuration, each unit only uses one shutter 71. While, for example, both shutters 71 are opened, both images from both these lenses (of 171 and 172 for example) may fall on top of each other. The program performs a similar procedure to that described above in order to find the separated images.

Figure 18:
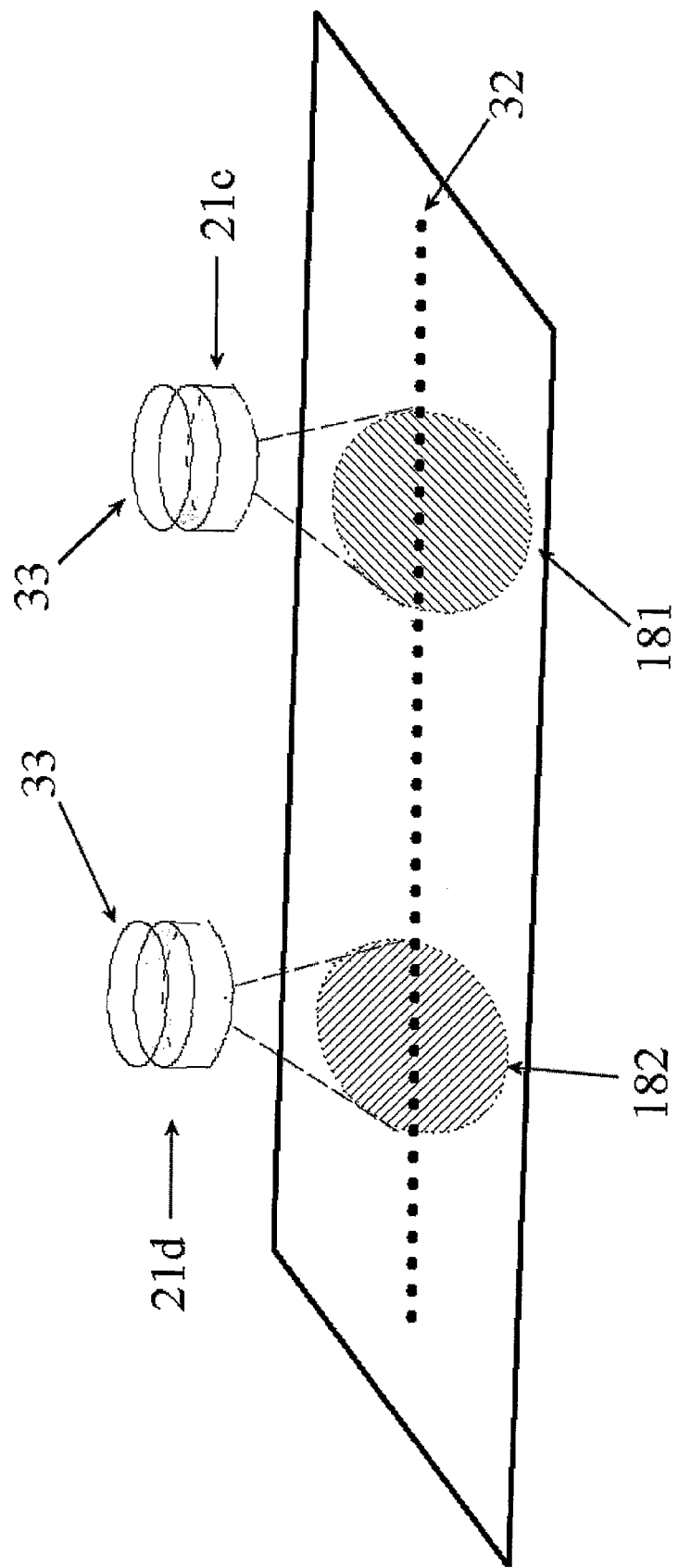
FIG. 18 is a summarized diagram perspective view showing the concept of a photo sensing device where two lenses are placed in front of the photo sensing device; on both lenses a spectrum filter is placed without any light shutter.

A second basic method to reduce the number of shutters is described below (See FIG. 18). Both shutters of one pair of lenses 21 may be eliminated, while both lenses 21 stay open constantly. This method can be implemented in specific designs where design parameters and dimensions cause the projected images 181, 182 to fall on separate locations on the CCD 32.

The method can also be implemented for images that may fall partly on top of each other; however, the images from both lenses should be clearly separated from each other in order for the computer program to perform the analysis. To find the position of object 11 coordinates the program separates this combined pattern into two separate image representations and executes the triangulation calculations as explained above.

Among the configuration design considerations that would enable such shutter reduction would include using a long enough CCD or using lenses with very short focal lengths. In such cases, the program is able to calculate the coordinates of each object image separately and thus, calculate the object coordinates as described in the above configurations.

Figure 19:
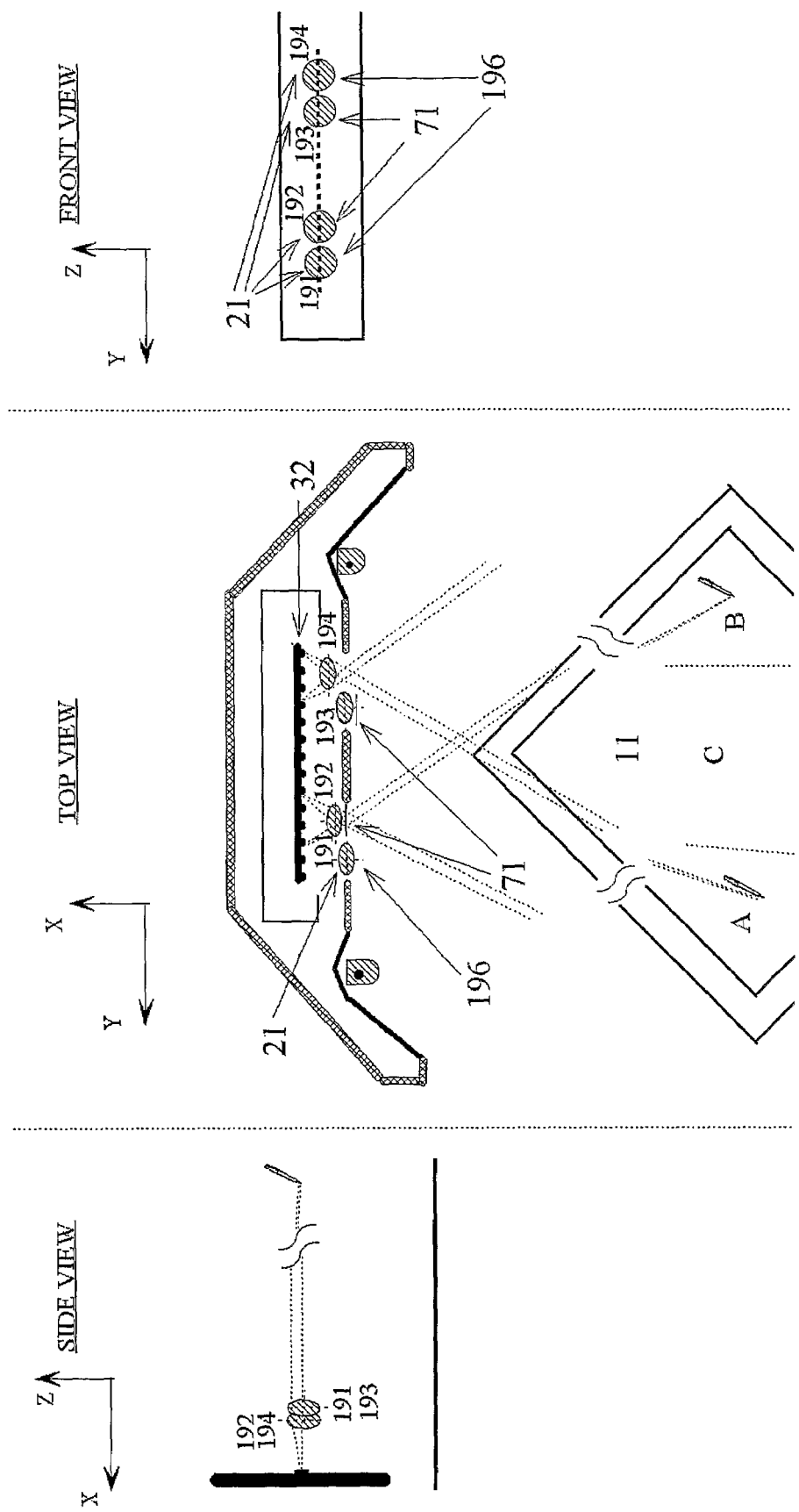
FIG. 19 is a summarized diagram showing a concept of a photo sensing device that includes tour lenses placed in front of it while using only two shutters placed over only two lenses.

The use of both shutter reduction methods for a four-lens corner unit is illustrated in FIG. 19. Here, only lenses 192 and 193 have shutters; lenses 191 and 194 are constantly open. The design parameters are such that when the shutter 71 for lens 193 opens, the images that are projected to the CCD 32 from lenses 191 and 193 are received on different locations on CCD 32. Thus, the computer program can separate between these images.

In a similar manner, images from lenses 192 and 194 fall on separate locations. The analysis between the images of 193 and 194 or between the images of 191 and 192 are performed by using the first shutter elimination method described above. Thus, the computer program is able to obtain a representation of four different images needed for the coordinate extraction.

It is possible to operate the described embodiments with multiple objects. Multiple object coordinate measurements can be implemented by using similar methods as those used for one-object measurements. In order to execute such measurements, the program identities, in one of its execution steps, the multiple object images on the CCD 32 and then analyzes each object image. The images on the CCD 32 must be separated enough in order for the program to perform the coordinate analysis. The methods of shutter reduction may be implemented for specific design parameters of such multiple image objects.

As mentioned above, it is also possible to integrate the ability to detect a third (Z) coordinate into any of the embodiments presented above and to other similar two-coordinate embodiments. This (Z) coordinate is the 'height' of an object 12 above a flat object. A view of such device is presented in FIG. 20.

Figure 20:
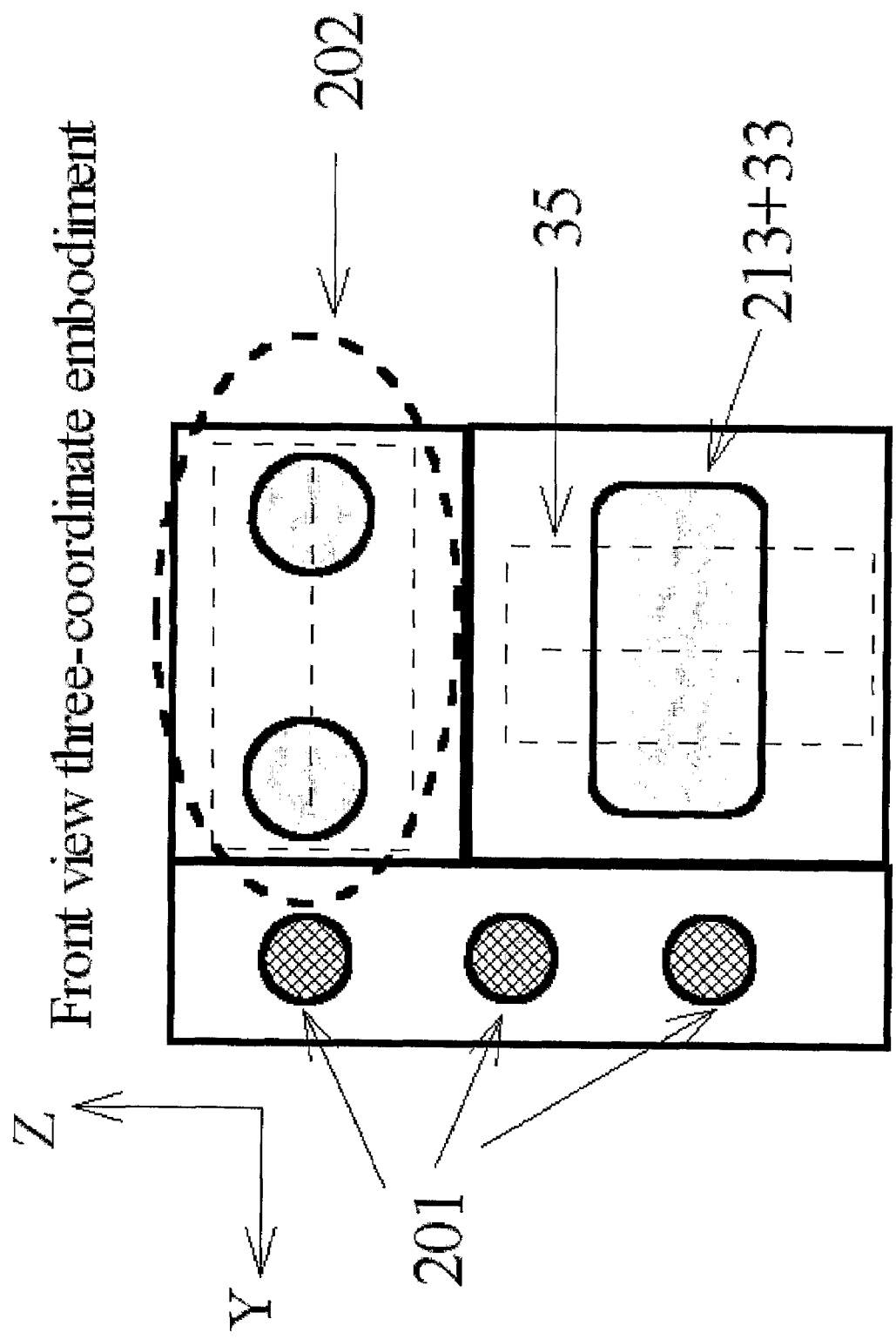
FIG. 20 is a summarized diagram showing a front view of an additional height measurement unit comprises a linear photo sensing device and one additional lens.
Figure 21:
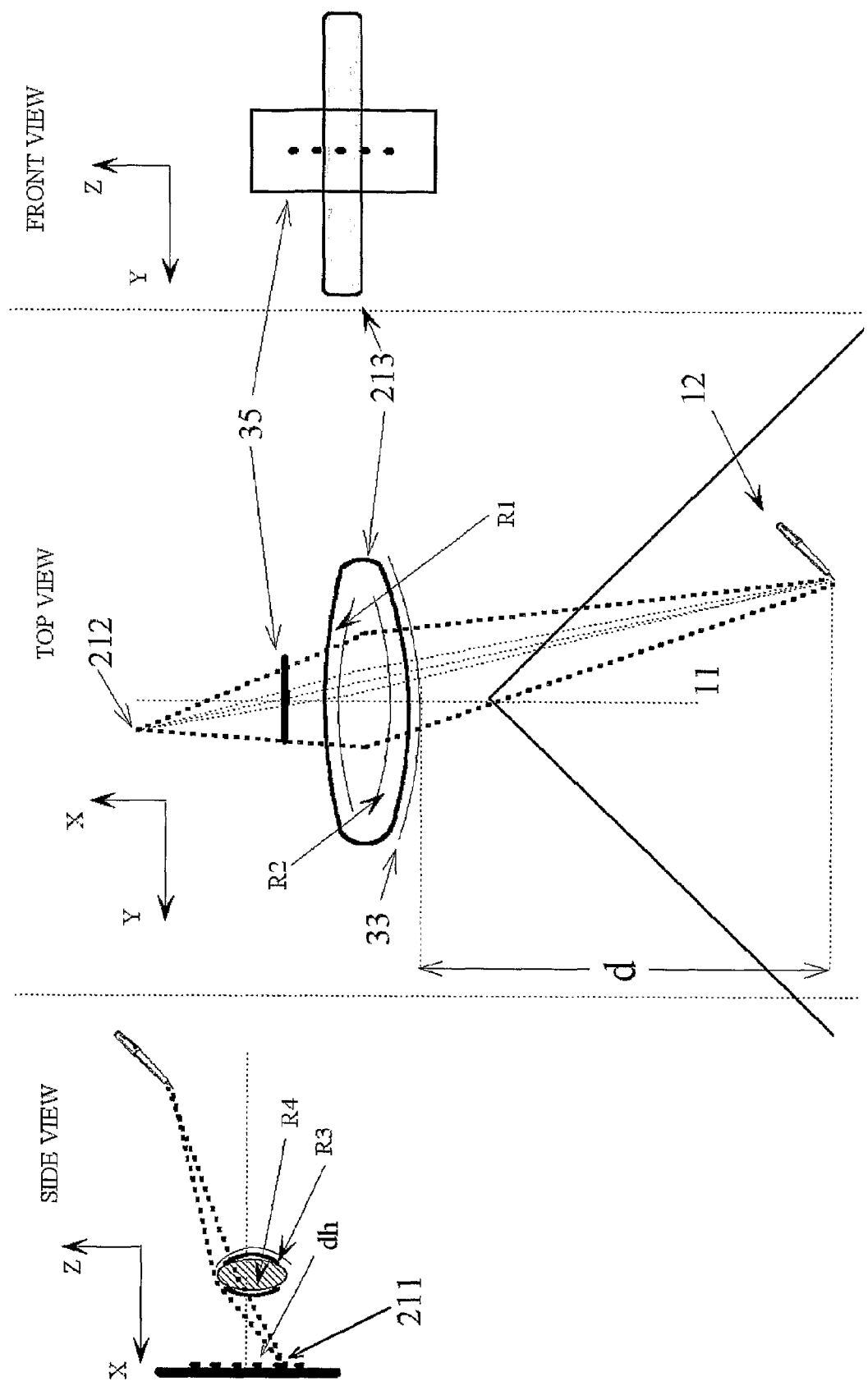
FIG. 21 are summarized front, top and side view diagrams showing a concept of a toroidal lens placed in front of a linear photo sensing device in order to find an additional coordinate.

Such a configuration for three-coordinate detection entails adding a linear CCD 35, toroidal lens 213, an IR filter 33, and IR sources 201 to any of the two-coordinate embodiments presented above (showed in FIG. 20 as 202). This linear CCD 35 may be placed separately from the device on any corner of the measured area 11, below, above, or along-side the two-coordinate device 202, and may be positioned perpendicularly to a flat surface. The lens 21 projects the image onto the additional CCD 35, as shown in FIG. 21.

In this configuration a toroidal lens 213 is used in order to increase the amount of light energy falling on the added CCD 35 on the X-Y plane. Cylindrical lenses may be used instead of the toroidal lens 213. While using a cylindrical lens, the amount of light that is projected on the CCD 35 may be small; thus, such cylindrical lens configurations are suitable for use with brightly colored objects 12, or when the object itself emits light.

Figure 22:
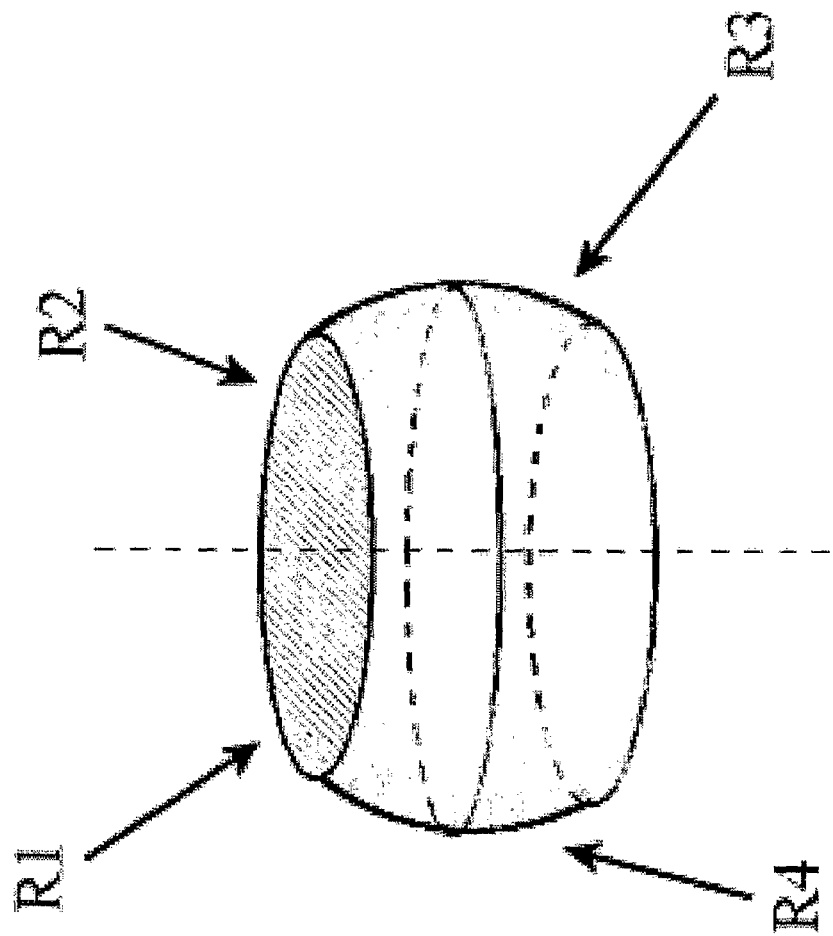
FIG. 22 is a summarized prospective view diagram showing the concept of a toroidal lens surface curvature.

The action of the toroidal lens 213 is to focus the light rays 211 on the X-Z plane onto the pixel line of CCD 35. However, on the X-Y plane, the rays are focused onto a point 212 that is located behind the CCD 35. This increases the light energy projected on the CCD 35 while the object 12 is located in various places within the measuring plane 11. The shape of lens 213 is causing the light rays collected from X-Y plane to focus at point 212, which is at a different location from the focal point 211 of rays collected from X-Z plane. FIG. 22 shows the shape of lens 213 , this lens is structured from different curved orthogonal surfaces with radiuses R1 and R2 that are differ in size from radiuses R3 and R4.

Figure 23:
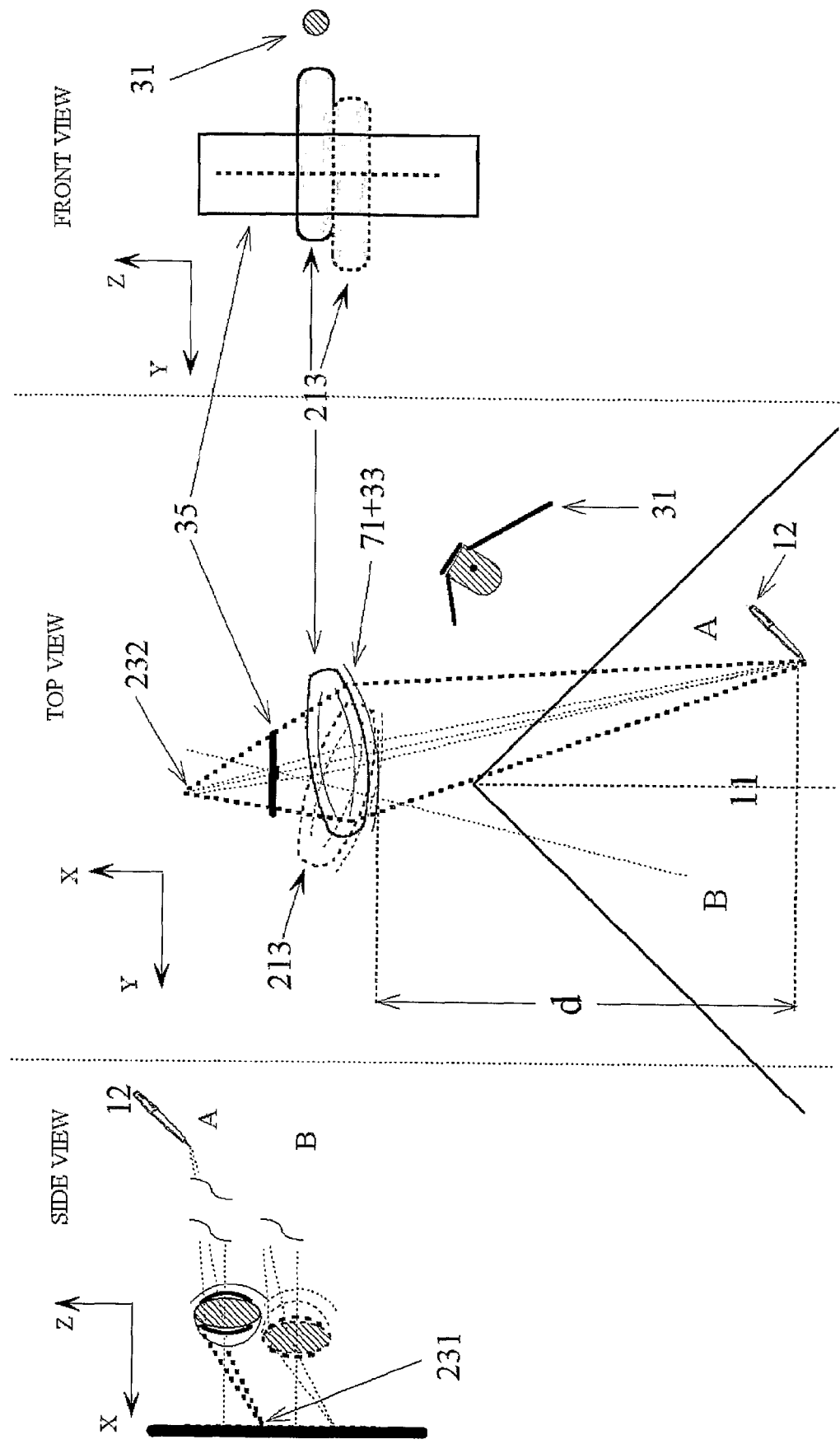
FIG. 23 are summarized front, top and side view diagrams showing the concept of two toroidal lenses placed in front a linear photo sensing device in order to find an additional coordinate.

Another possible embodiment with a similar configuration involves the use of multiple toroidal lenses. Various amounts of such lenses may be included in a specific design; however this patent application will refer to an example of a two-lens design as described in FIG. 23.

Here two toroidal lenses 213 are used to get a large amount of light on the CCD 35. The two lenses 213 operate similar to the previous embodiment. The lenses 213 are angled to each other in order to face different sections on the measurement area (A and B). Two images are received on the CCD 35. The computer program separates the images by opening and closing sequentially the LCD shutters 71 in front of the lenses 213 or by using a long enough CCD 35 in which the projected images do not fall on top of each other.

In all the above three-coordinate embodiment descriptions, the height Z is then determined by trigonometric calculation taking into account the distance d of the object 12 from the device, as determined from the two-coordinate device.

These suggested configurations of adding a third (Z) coordinate measurement by adding a linear CCD 35 and lens/s 213 may be integrated with other known two-coordinate measurement devices which are designed to find the position of an object 12 on the measurement area 11 (X and Y position coordinates), such as devices which use light to find the coordinates as described in European Patent Application EP0572009. In this patent application, an optical touch screen control system having a plurality of light emitter and detector pairs positioned on the opposite sides of a screen display is described.

Another three-coordinate embodiment is based on the use of a multi-line CCD and using similar principles as described for the two-coordinate embodiments above. This multi-line CCD might be a rectangular area array CCD such as are used in video or still digital cameras or a special custom design CCD with a specific number of lines. The CCD pixel lines might be spaced unevenly as may be required for a specific design application. An example of such a rectangular CCD that may be used is the FTF3020-C CCD manufactured by Philips Corporation.

Figure 24:
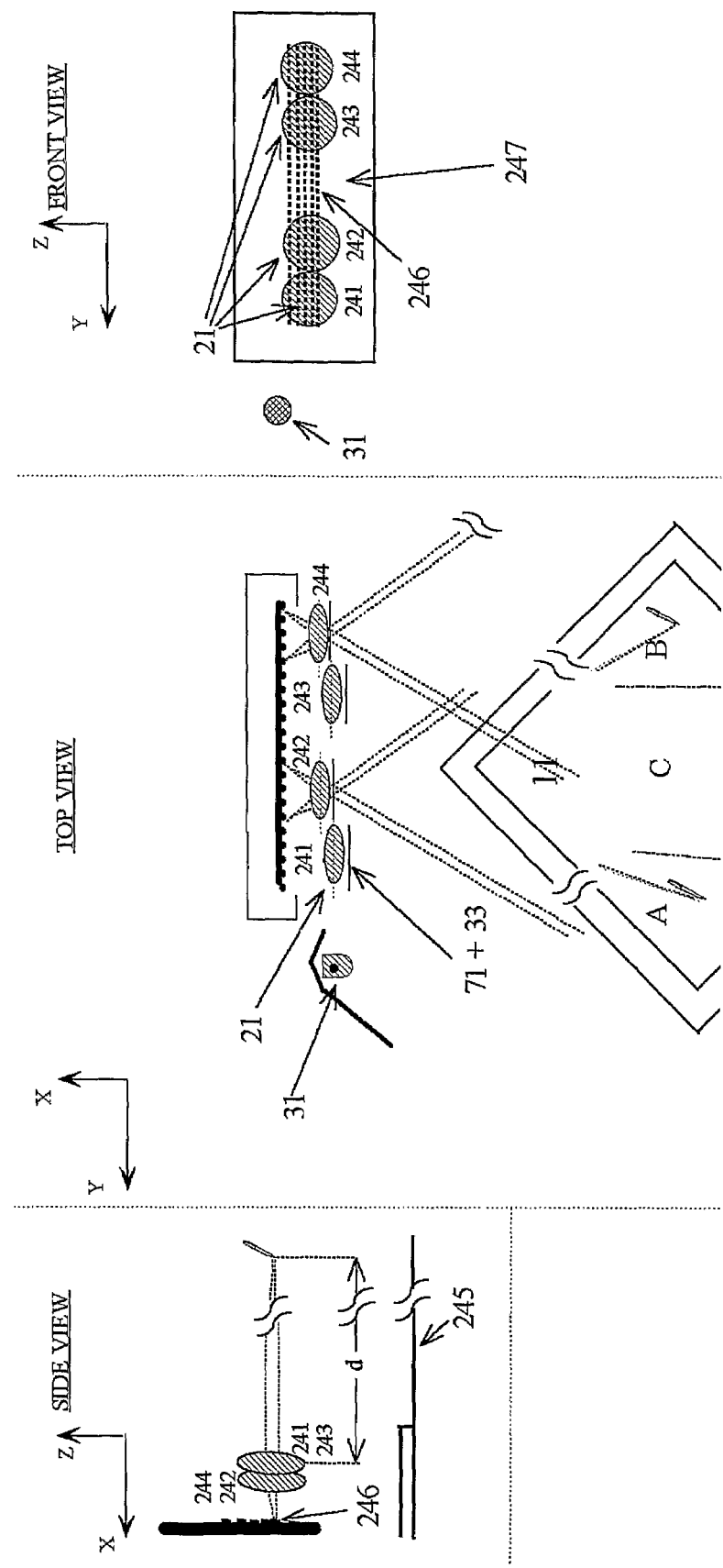
FIG. 24 are summarized front, top and side view diagrams showing the concept of using an area photo sensing device in order to find an additional coordinate.
Figure 25:
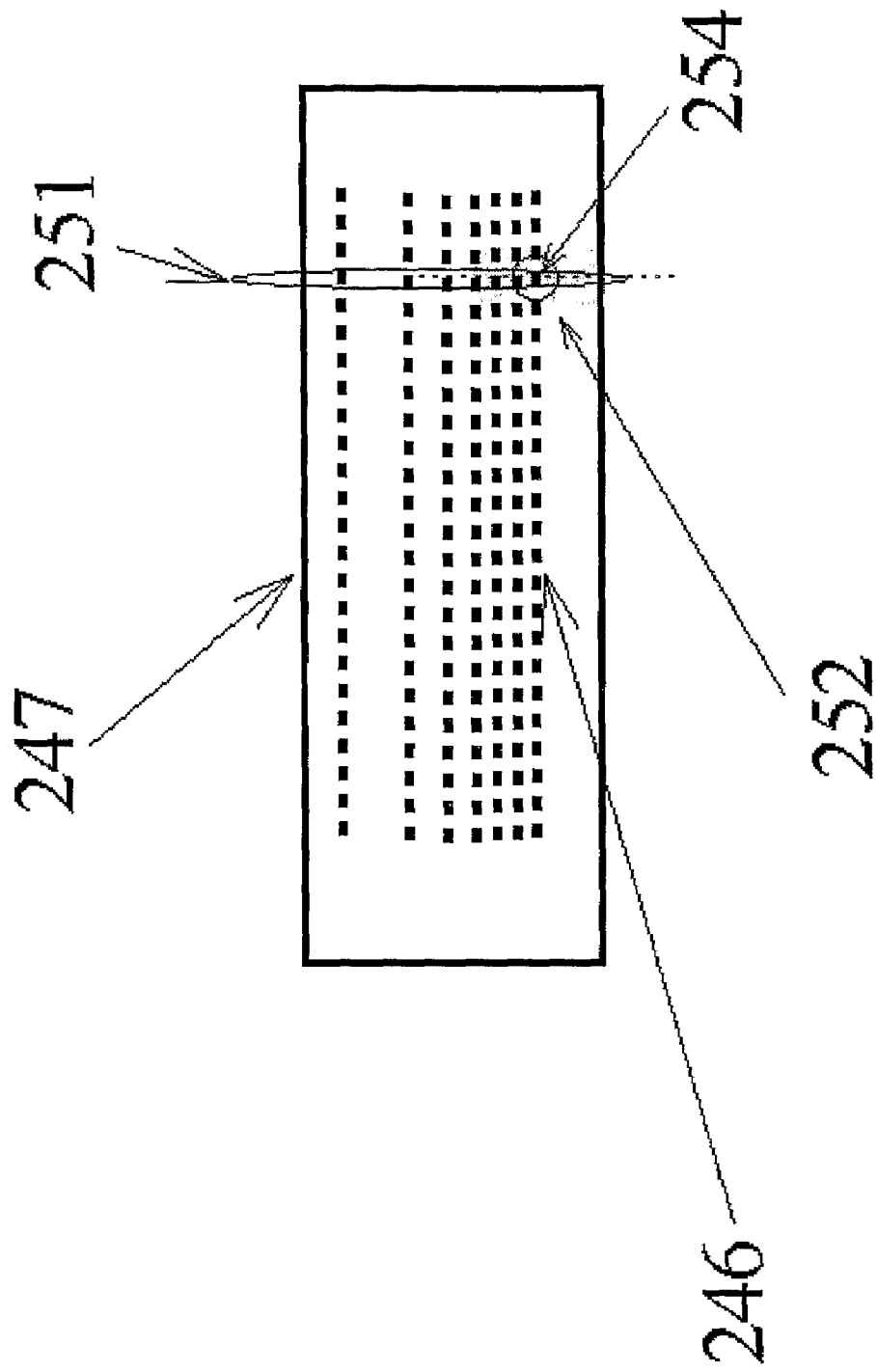
FIG. 25 is a summarized front view diagram showing the concept of an area photo sensing device used for finding an additional coordinate.

The configuration of this three-coordinate embodiment entails placing such multi-line CCD instead of a linear CCD in any of the above-described embodiments. The lens system may include spherical lenses. The location of the CCD and the lenses above a flat surface will be such that when an object enters the measurement space, the image created by the lens will be projected on the first pixel line. For example, see FIGS. 24 and 25 with the basic structure of one-CCD four-lens device configuration.

In this configuration, the program first derives the X and Y position coordinates. Whenever an object 12 is placed in the measurement space 11, a part of the object's image falls on the first long horizontal pixel line 246. Using the same methods which were used for the two-coordinate embodiments, analyzing this first pixel line enables the calculation of the X and Y coordinates, as described above for the two-coordinate four-lenses configuration.

Only one image from one of the lenses is needed for analyzing the Z coordinate. This can be achieved by closing all shutters except for one. Based on the X, Y coordinate measurement, the program opens one lens which is aligned to give the best result for that section (A, B or C).

The Z coordinate can be extracted by various methods. One of such methods is by analyzing the image that falls on a column, a short pixel line, (see 251 in FIG. 25). It is sufficient to use only such one pixel column. The specific column 251 line may intersect with the 'center of momentum' 254 found in the X-Y analysis.

Figure 26:
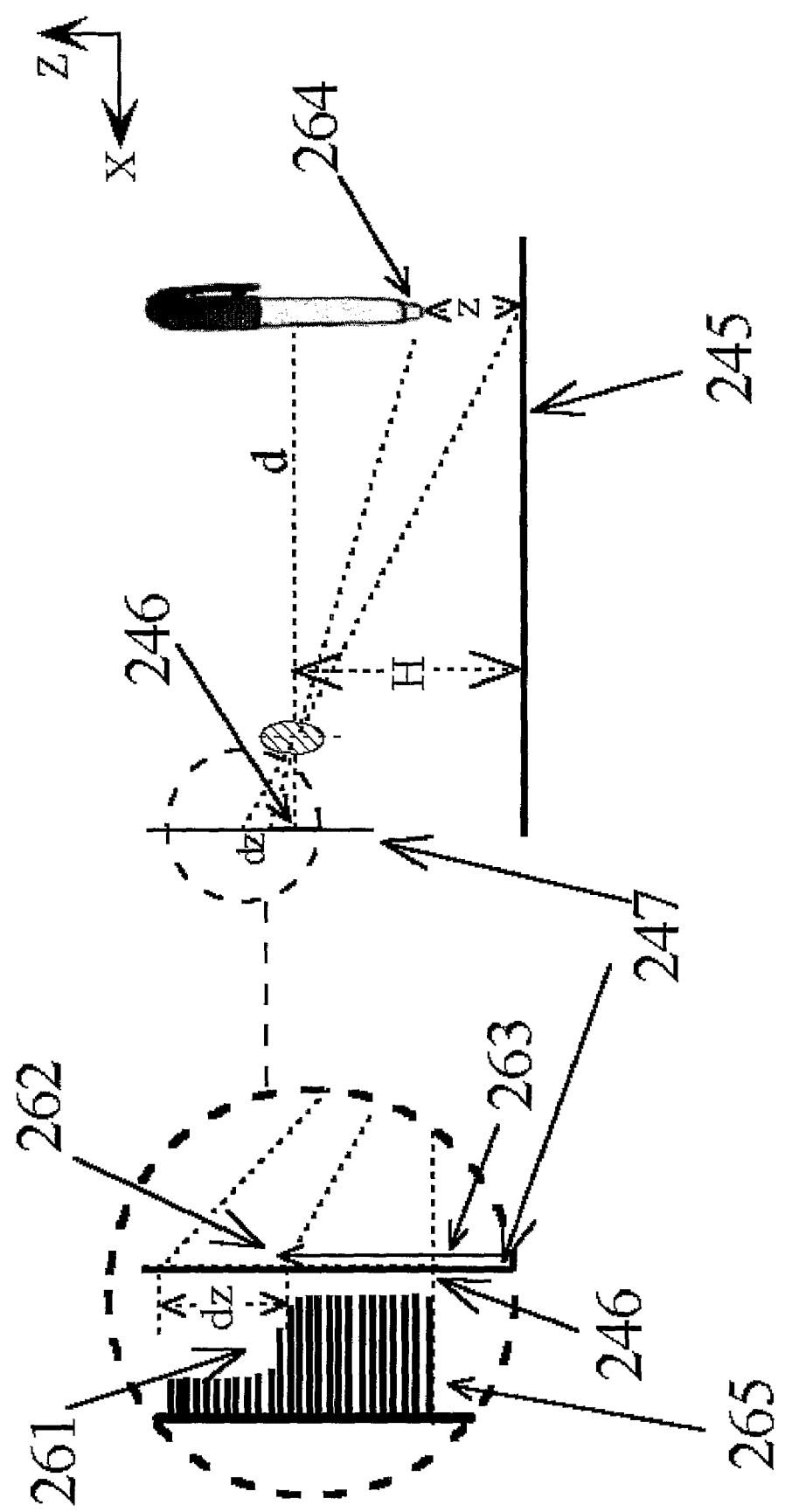
FIG. 26 is a summarized side view diagram showing the concept of a system used for finding an additional coordinate, while a pointing object's image falls on an area photo sensing device surface.

FIG. 26 illustrates the method of extracting the Z coordinate. The first step is finding the image edge 262 on one of the column pixel lines 251 in FIG. 25. Then, by applying trigonometric calculations using the known distance d of the object 12 from the device, which is found during the X, Y analysis, it is possible to calculate the location of the height coordinate (Z) of the object.

In order to find the image edge 262 in FIG. 26 the program may analyze the light intensity difference between neighboring pixels 261 on the column pixel line 251 that is located on or near the 'center of momentum' 254. The tip of the object 262 is found by evaluating the differences in light intensity levels between two adjacent pixels on this column 251. When this difference is found to be over a given threshold value, the program might consider this location as the image of the tip 262 of the object 264.

Figure 27:
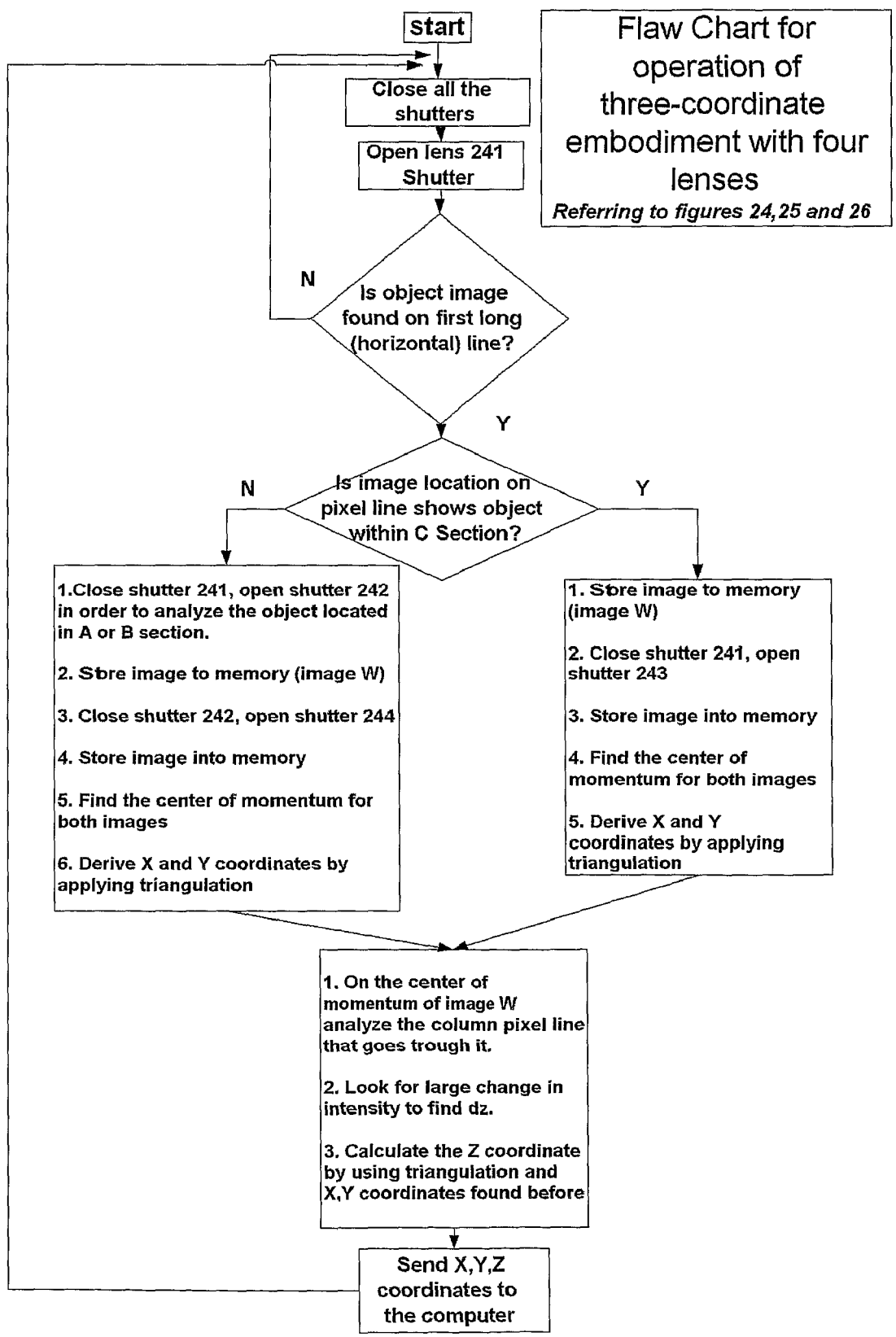
FIG. 27 is a summarized flaw chart diagram showing the main steps taken while operating three-coordinate measurement using one area photo sensing device and four lenses placed in front of it.

FIG. 27 is a flow chart providing the basic operation of this embodiment. The principle of operation is similar to the various embodiments described in this document. The items in FIG. 27 refer to items in FIGS. 24, 25 and 26.

Figure 28:
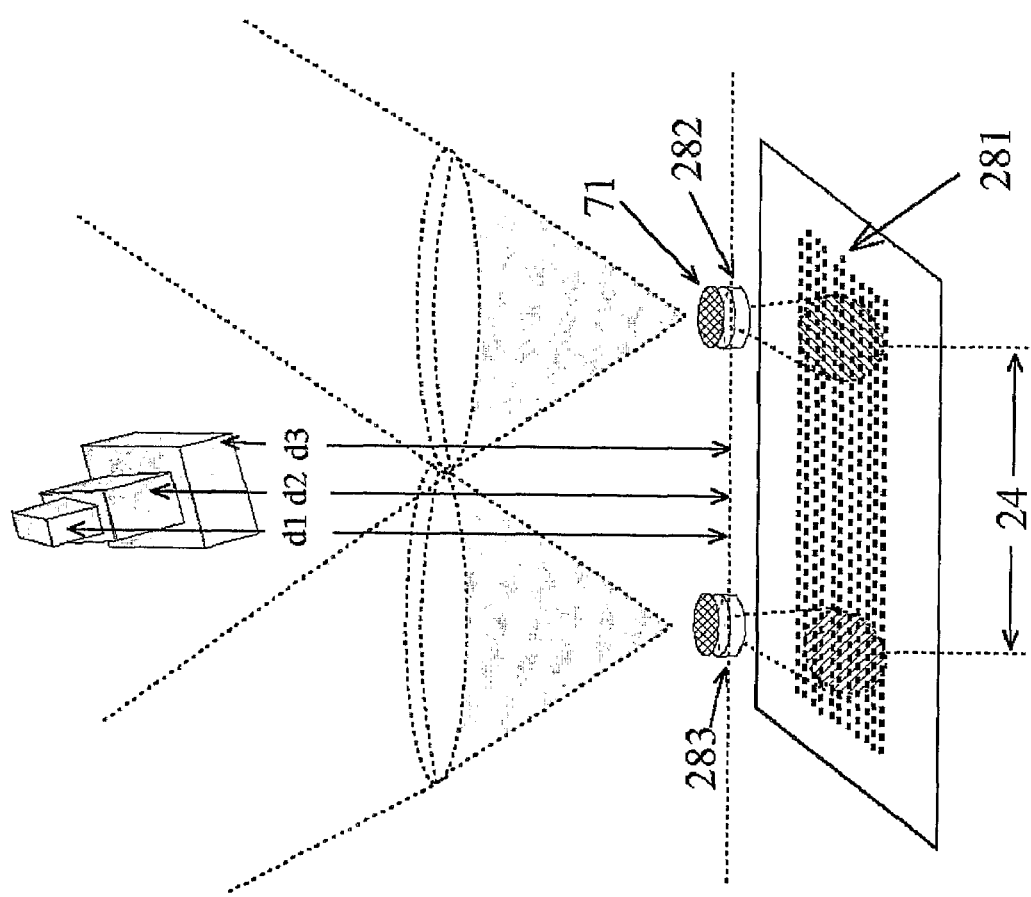
FIG. 28 is a summarized prospective view diagram showing the concept of three-dimensional surface curvature measurement of an object.

This three coordinate measurement method can be extended further to include three dimensional surface curvature measurement of an object (FIG. 28). Here a similar configuration is used for the three-coordinate embodiment described above, using a full rectangular CCD array 281 such as may be used for still digital cameras or video cameras.

This 'surface measurement' option can be used in applications such as a 'virtual keyboard' in which the locations of fingers may be recognized above a printed or a projected keyboard. It may also be used in machine vision object recognition applications for identifying objects' shapes and position coordinates. This option may be useful for handling relatively close objects. Such applications may include assembling small parts by automated machines or using robots for handling relatively small objects. A virtual keyboard implementation is described in European Patent Application EP 1248227. In this patent application, a few methods are described for identifying the fingers' position in relation to the keyboard.

In the present invention, the designer might prefer to use a white light in order to capture more details of an object. In addition, a three-color CCD might also be used. The color information may be translated into gray scale values or may be used fully in order to capture the color details of the measured object. These color details can contribute to the analysis process enabling more accurate results. A known triangulation and pattern recognition analysis on stereoscopic images may be employed in order to extract the three (X, Y, Z) surface curvature coordinate of the object.

Example of such analysis might entail finding the distances (d1, d2 . . . di) of various objects parts placed before the device by 'recognizing' them in sub-areas of the images. These objects part distances may be found by employing methods of finding the differences in location of the images 'sub-areas' on the CCD and using triangulation.

The start of the process is dividing the images into known specific 'recognized' areas by examining the images luminance details similar to the known 'finite element analysis' method, and then the background behind the object might be eliminated.

In the implementation of such process with the virtual-keyboard embodiment, the general shape and colors of the fist and its fingers might be known in advance as well as the shape and the color of the characters of the projected or printed keyboard—this might help in the analysis process by looking for specific details in order to determine the fingers' locations.

Figure 28A:
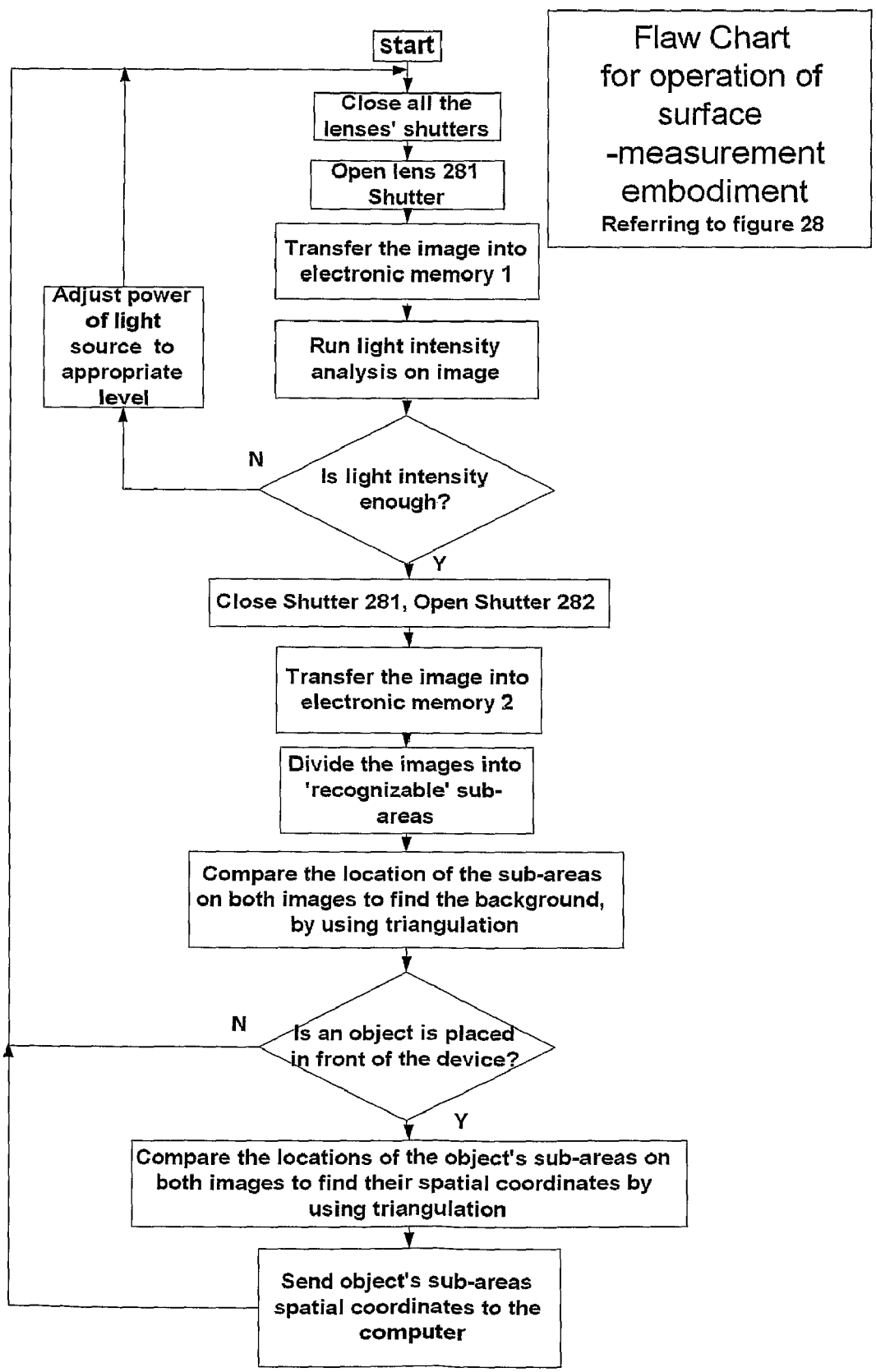
FIG. 28a is a summarized flaw chart diagram showing the main steps taken while operating three-coordinate surface measurement device which comprises one area photo sensing device and two lenses placed in front of it.

This process might include adjusting the light intensity of the source light. Steps of one exemplary process are shown in FIG. 28A; the description of the flow chart refers to items in FIG. 28.

As mentioned above, LCD blockers might cover the lenses, however, the methods which reduce the number of shutters may be implemented as described above. These LCD blockers will open and close sequentially in order to capture the separate images from the CCD.

The methods of increasing the quality of image in wide angle sections (A, B) of the measured area, which are described above might also be employed in order to increase the 'viewing angle' of the device.

Figure 29:
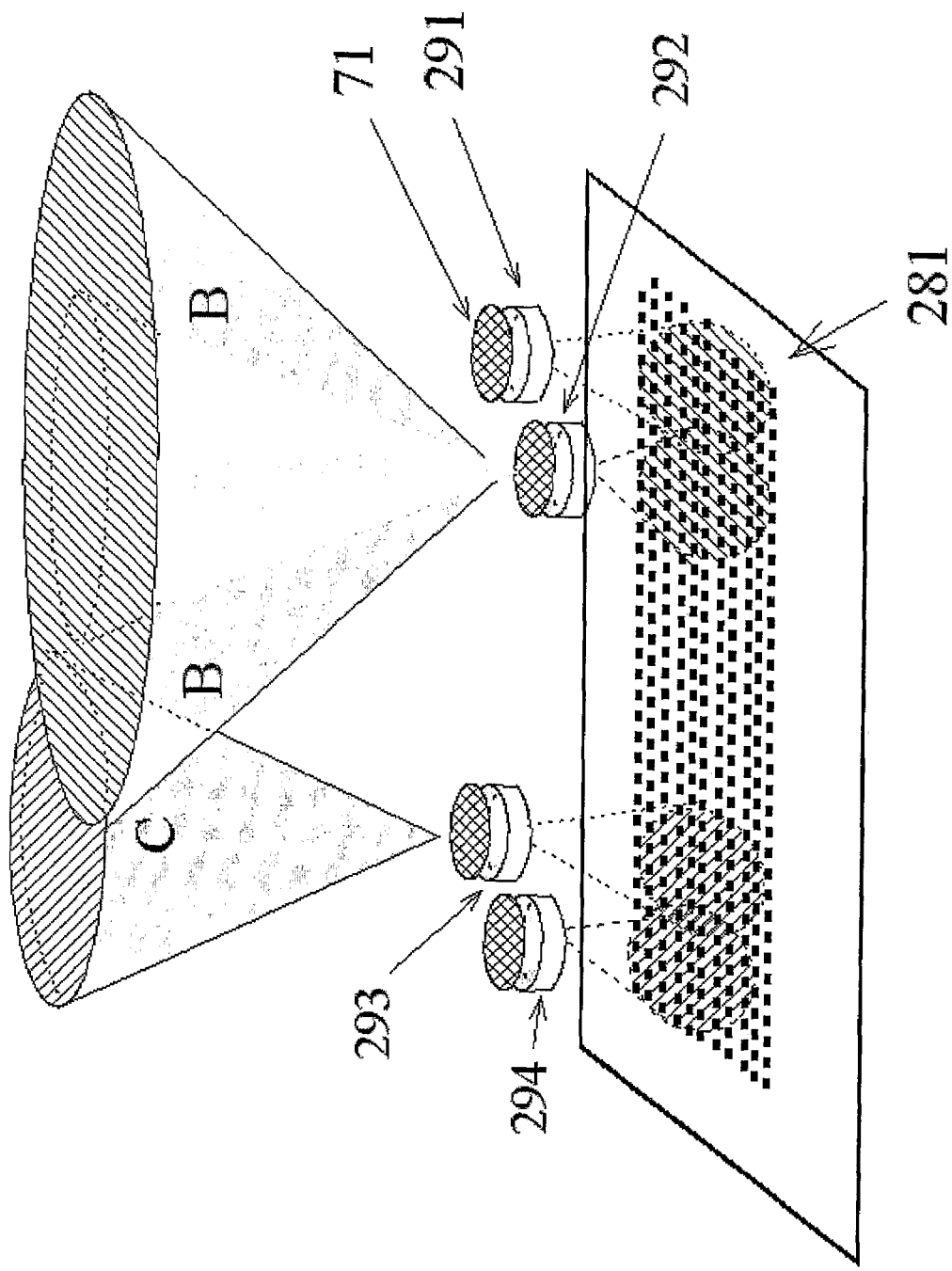
FIG. 29 is a summarized prospective view diagram showing the concept of three-dimensional surface curvature measurement of an object while using additional two lenses in order to increase the viewing angle.

An example for one of these methods is described in FIG. 29. In this four-lens configuration lenses 291 and 293 are placed at a distance from the CCD 281 in such a way that when an object is placed inside the middle of a conical space C the image projected on the CCD 281 will be near focus. Lenses 292 and 294 are aligned so that while an object is placed at a large angle from the optical axis of the lens (hollow conic volume B) its image will be near focus on the CCD 281. Such alignment is possible because of the symmetric properties as was described above for the two-coordinate embodiment.

In order to extract the necessary data for a specific application, the program may run processes such as image stitching, pattern recognition and/or statistical known methods.

Methods described in this application for increasing the field of view may be integrated into a photo-sensing CMOS technology that includes time of flight (TOF) circuitry for measurement of three coordinates in each sensitive to light pixel, as described in PCT International Publication No. WO 02/057714 A1.

Figure 30:
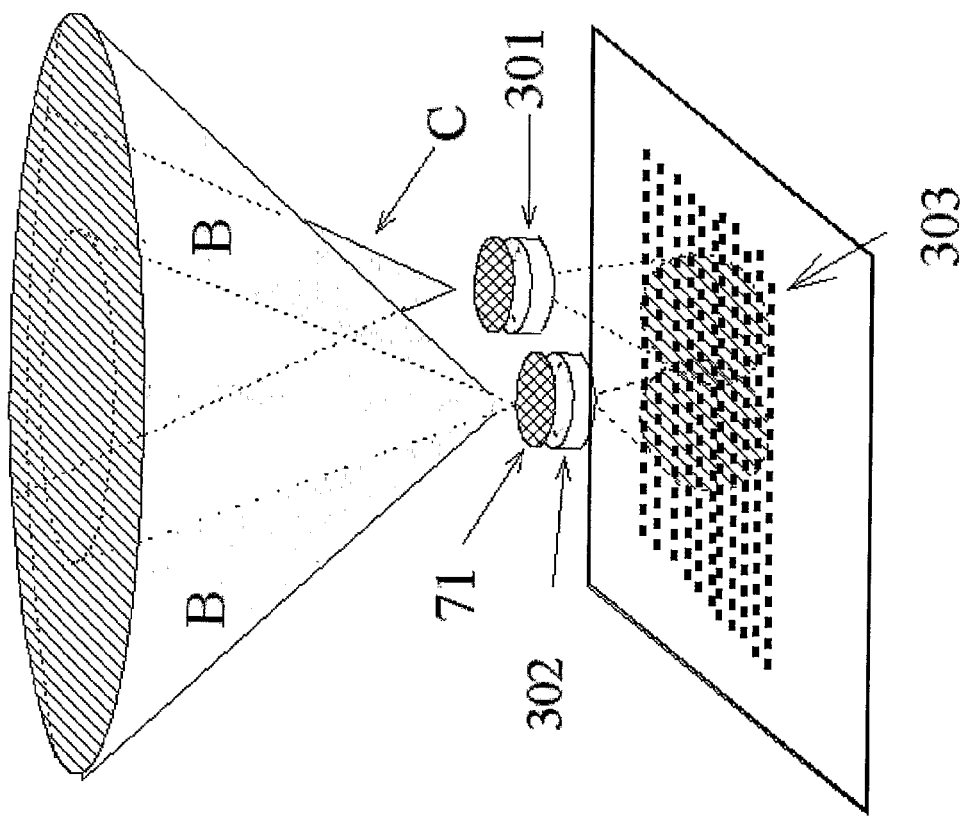
FIG. 30 is a summarized prospective view diagram showing the concept of using the Time Of Flight (TOF) of light sensitive array, measuring three coordinates in each of its pixels, while placing one additional lens in order to increase the viewing angle of the device.

FIG. 30, for an example, describes a two-lens configuration with a wide-angle solution. In FIG. 30 lens 301 is aligned so that objects placed on the conical space C are near focus. The other lens 302 is aligned so that the light coming from objects placed inside hollow conical space B is near focus. Both lenses may have shutters 71 placed in front of them and they are sequentially opened and closed. Using the TOF sensitive to light CMOS 303 the distance of a specific point on the measured object is derived, the angular location of such a point is derived by its image location on the CMOS active surface.

These principles of wide-angle solutions and the other principles (as described above) might also be used for two-coordinates devices, while using only one pixel-line of such a TOF measurement CMOS.

Additional use of the present invention is a single unit that includes a lens to capture relatively far object images and in addition, the ability to get three-dimensional information from objects which are placed relatively in close range of the device (see FIG. 30a). This configuration might be implemented in systems based on machine vision when such three-dimensional information is needed in order to perform specific tasks while using the same device for general imagery.

Here, while shutter 71 of lens 306 is closed, lens 304 and 305 are used to get a three coordinate image, as described above. While both shutters 71 of lenses 304 and 305 are closed and the shutter 71 of lens 306 is open.

Figure 31:
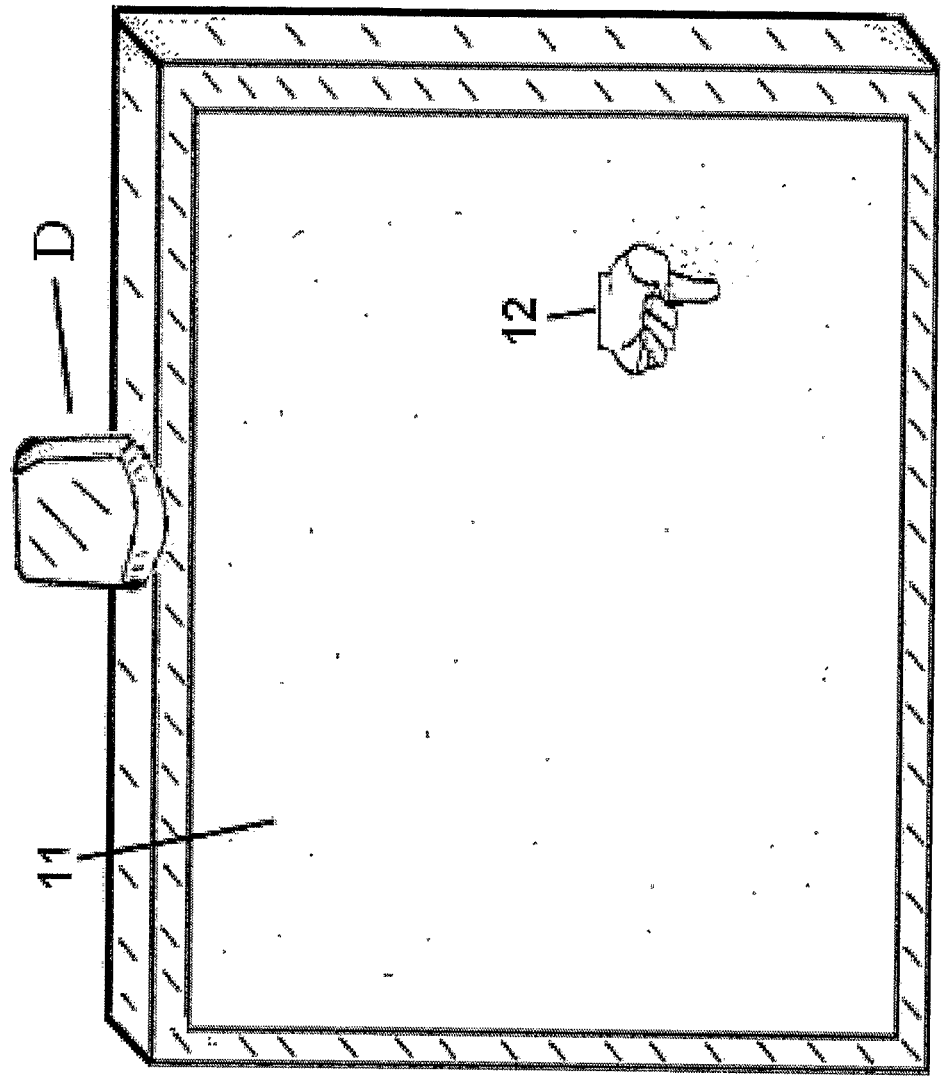
FIG. 31 is a summarized diagram showing the concept of an optical coordinate input device attached to the center of one of the frame sides of a rectangular measurement enclosure while a pointing finger is inserted into the measurement plane.
Figure 32:
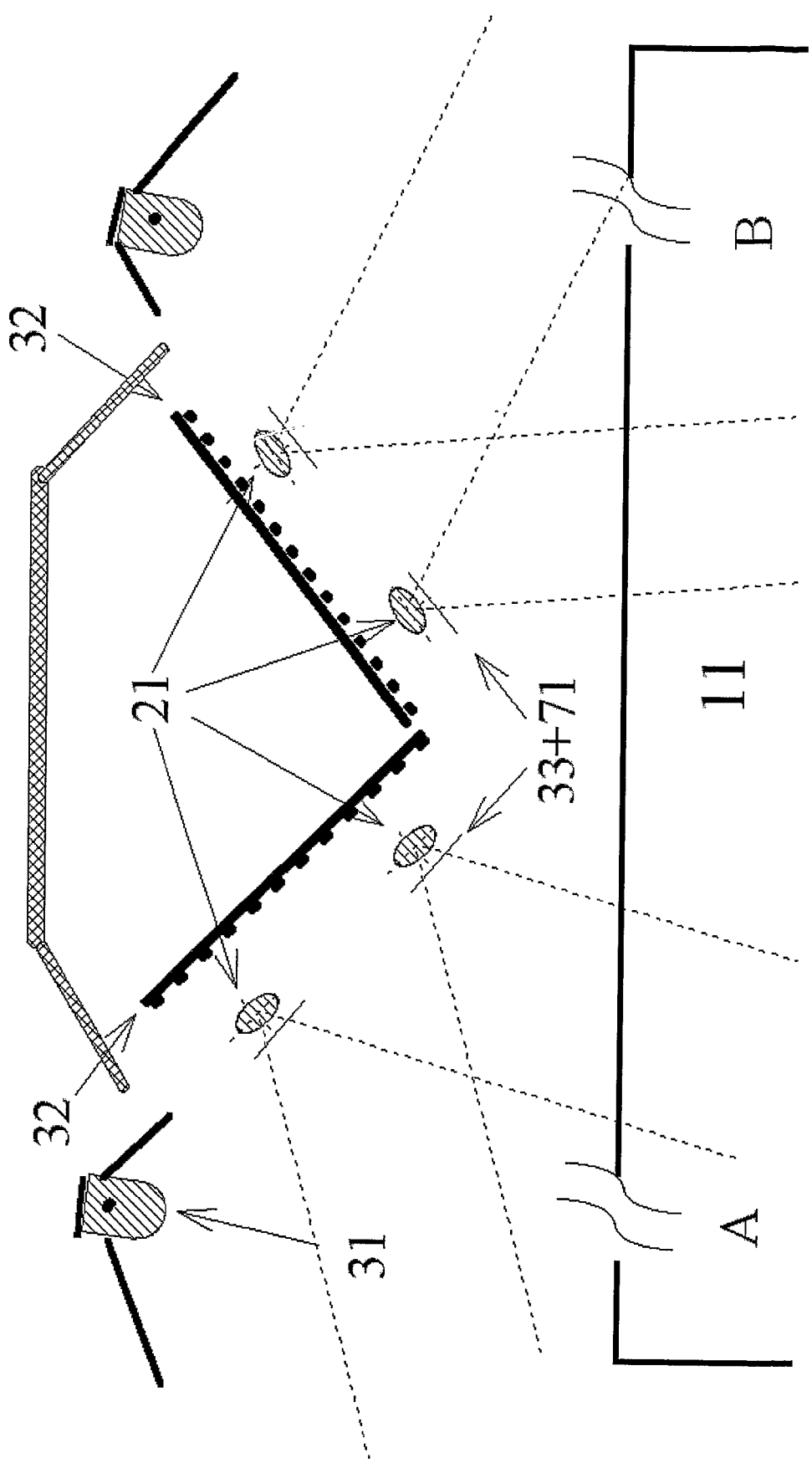
FIG. 32 is a summarized diagram showing a concept of a top view of a coordinate measurement device containing two photo sensing devices with two lenses placed in front of each photo sensing device while facing different sections of the measurement area.

Another embodiment of the present invention is illustrated in FIG. 31. A single unit is constructed of two corner devices, a two-coordinate, a three-coordinate or a surface-measurement device (as described above) arranged back to back, side by side or one on top of the other as in FIGS. 32 and 33.

This unit may be attached to the middle of the frame of the measurement area. This arrangement would enable the device to cover a large viewing angle using only one unit.

In these configurations there will be an overlap area in the middle of the monitored area 11. The computer program will be designed to switch between the two devices while it detects an object 12 inside a specific measurement area 11. Using the same methods described above will enable it to derive the coordinates.

Figure 33:
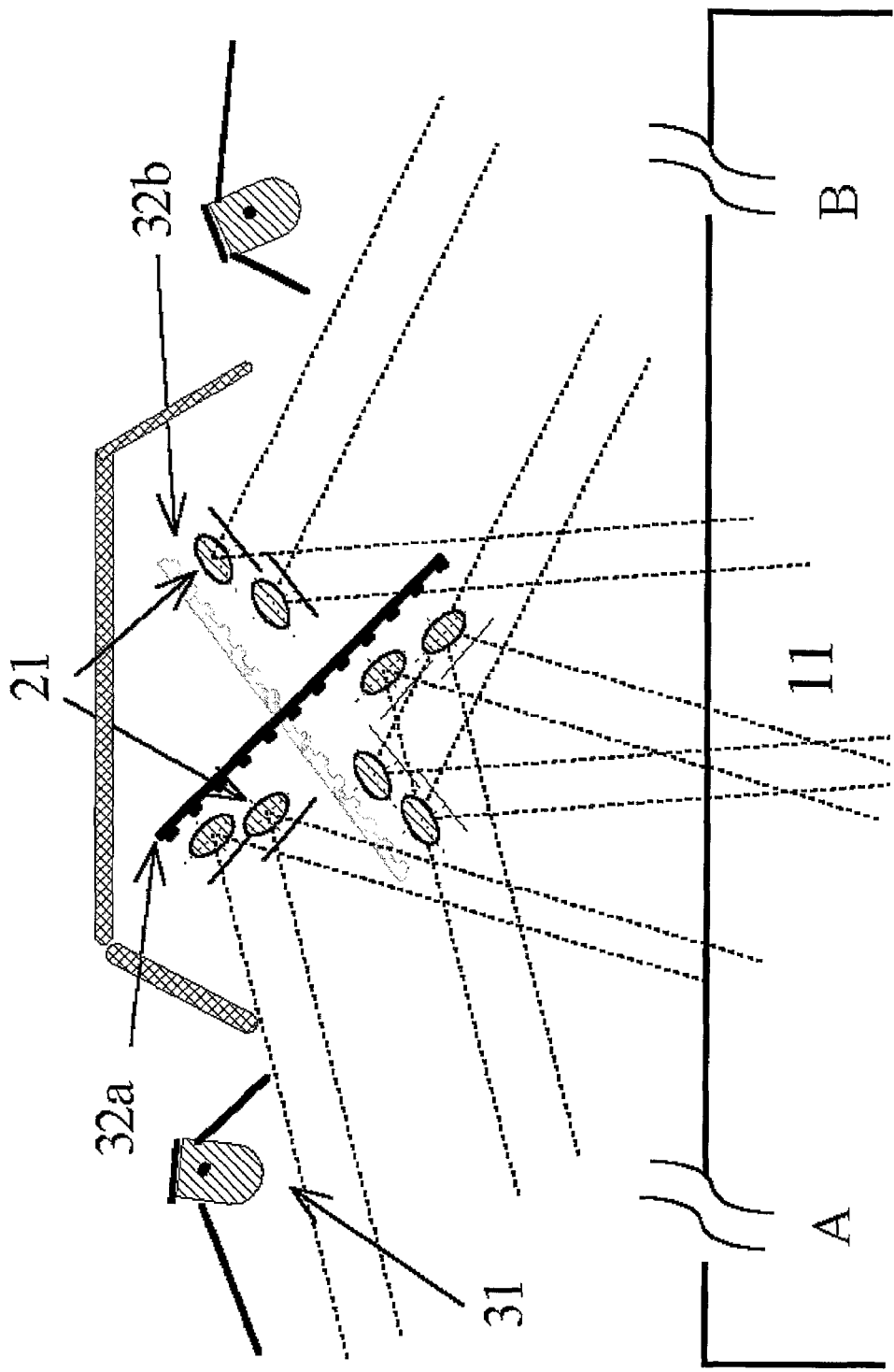
FIG. 33 is a summarized diagram showing the concept of a top view of coordinates measurement device containing two photo sensing devices with four lenses placed in front of each photo sensing device and one photo sensing device is placed on top of the other while each photo sensing device faces a different section of the measurement area.

In FIG. 33 a unit with two CCDs 32a, 32b are placed one on top the other. Each CCD has four lenses 21. Each such CCD covers half of the measurement area 11 and operates similar to the four-lenses corner unit.

While the above description contains many specifities, these should not be construed as limitations on the scope of the invention, but rather as exemplifications of the preferred embodiments. Those skilled in the art will envision other possible variations that are within its scope. Accordingly, the scope of the invention should be determined not by the embodiment illustrated, but by the appended claims and their legal equivalents.

What is claimed is:

1. An input apparatus of computerized device for measuring an object's relative location within a predefined measurement space wherein said apparatus uses a single light-receiving unit positioned at a corner area of said measurement space, said apparatus is comprised of:
   a. at least one light emitting source transmitting light extending over said predefined measurement space;
   b. at least two photo sensing units comprising said single light-receiving unit for receiving scattered light rays from the object wherein said photo sensing units are proximate to the same said corner area of said measurement space and each such photo sensing unit is located at a different spatial location enabling at least two different viewing angles of said object;
   c. at least two lenses positioned in front of said photo sensing units for condensing said scattered light rays;
   d. a spectrum filter positioned in the route of said light rays wherein said spectrum matches the light spectrum emitted from said light sources;

wherein a coordinate calculating means is used for calculating locations where images of said object are created on said photo sensing units by using each output from said photo sensing units, and finding the relative spatial coordinates of said object by using the calculated locations of said images.

2. The apparatus of claim 1 wherein said at least two photo sensing units are part of a single electronic chip and at wherein least two lenses are positioned in front of said single electronic chip for condensing said scattered light rays.

3. The apparatus of claim 1 wherein said single light-receiving unit is comprised of at least one photo sensing electronic chip and wherein at least two lenses are positioned in front of said at least one photo sensing electronic chip for condensing said scattered light rays.

4. The apparatus of claim 3 further comprising at least one opto-electric shutter means for blocking lenses for a controllable time interval.

5. The apparatus of claim 3 wherein said apparatus is positioned at a single screen display corner area.

6. The apparatus of claim 3 further comprising additional light receiving unit and additional respective units of at least one cylindrical or toroidal lens and a light filter unit positioned in front of said additional light receiving unit, wherein said additional units enable to measure a third dimension of said measured object.

7. The apparatus of claim 1 wherein said single light-receiving unit is comprised of at least one CCD or one light sensitive CMOS unit.

8. The apparatus of claim 1 wherein said at least two photo sensing units are angled to each other and said at least two lenses are aligned at optimal distances from said photo sensing units so that the image of an object, placed at various locations within the measurement space, is projected into the active area of said photo sensing units and optimal image focus is achieved.

9. The apparatus of claim 1 wherein said light receiving unit is comprised of only one single photo sensing unit, at least four lenses are placed in front of said photo sensing unit, wherein at least two lenses out of said four lenses are tilted towards different sections of said measurement space.

10. The apparatus of claim 1 wherein said single light receiving unit comprised of only one single photo sensing unit, at least four lenses are placed in front of said photo sensing unit, all viewing same said measurement space and all having parallel planes in relation to said photo sensing unit.

11. The apparatus of claim 1 wherein at least four lenses are used, all viewing same said measurement space and all having parallel planes in relation to said at least two photo sensing units.

12. The apparatus of claim 1 wherein at least two of said single light-receiving units are placed each at a single opposite corner area of a screen display, wherein each of said single light-receiving units is viewing a different measurement space then all other measurement spaces viewed by the rest of said single light-receiving units.

13. The apparatus of claim 1 wherein said single light-receiving unit is comprised of one multi-line photo sensing array unit, used in combination with at least two lenses enabling measurement of three coordinates position of an object placed within said measurement space.

14. The apparatus of claim 1 wherein said single light-receiving unit is comprised of one photo sensing unit used in combination with at least two lenses wherein said measurements are used for virtual keyboard implementations.

15. The apparatus of claim 1 wherein said single light-receiving unit is comprised of one photo sensing unit used in combination with at least two lenses said measurements are used for machine vision implementation.

16. The apparatus of claim 1 wherein said single light-receiving unit is comprised of at least one photo sensing unit, wherein said photo sensing unit is integrated with additional circuitry in order to measure time of flight of light, wherein the relative distance of the object is calculated by using said time of flight of light measurement.

17. The apparatus of claim 1 wherein the distances of said at least two lenses from said photo sensing units are optimized in order to achieve an optimal image focus of both nearby objects and far objects located within said measurement space.

18. The apparatus of claim 1 wherein said at least two lenses are spherical, cylindrical or toroidal shaped lenses.

19. The apparatus of claim 1 wherein said at least one light emitting source emits a specific monochromatic color, this monochromatic color might be within the invisible or within the visible light spectrum.

20. The apparatus of claim 1 further comprising at least one opto-electric shutter means for blocking lenses for a controllable time interval.

21. The apparatus of claim 1 wherein the emitted light intensity from said at least one light emitting source changes according to said object distance form the apparatus.

22. The apparatus of claim 1 wherein in front of each said photo sensing units at least two lenses are placed wherein lenses are tilted towards different section of said measurement space.

23. An input apparatus of computerized device for measuring an object's relative location within a predefined measurement space wherein said apparatus uses a single light-receiving unit positioned at a corner area of said measurement space, said apparatus is comprised of:
   a. at least two photo sensing units comprising said single light-receiving unit for receiving scattered light rays from the object wherein said photo sensing units are proximate to the same said corner area of said measurement space and each such photo sensing unit is located at a different spatial location enabling at least two different viewing angles of said object;
   b. at least two lenses positioned in front of said photo sensing units for condensing said scattered light rays;
   c. a spectrum filter positioned in the route of said light rays;
wherein said object includes emitting light means and wherein a coordinate calculating means is used for calculating locations where images of said object are created on said photo sensing units by using each output from said photo sensing units, and finding the relative spatial coordinates of said object by using the calculated locations of said images.

24. An input apparatus of computerized device-for measuring an object's relative location within a predefined measurement space wherein said apparatus uses a single light-receiving unit positioned at a corner area of said measurement space, said apparatus is comprised of:
   a. at least one light emitting source transmitting light extending over said predefined measurement space;
   b. at least two photo sensing units comprising said single light-receiving unit for receiving scattered light rays from the object wherein said photo sensing units are proximate to the same said corner area of said measurement space and each such photo sensing unit is located at a different spatial location enabling at least two different viewing angles of said object;
   c. at least two lenses positioned in front of said photo sensing units for condensing said scattered light rays;
wherein a coordinate calculating means is used for calculating locations where images of said object are created on said photo sensing units by using each output from said photo sensing units, and finding the relative spatial coordinates of said object by using the calculated locations of said images.

25. An input apparatus of computerized device for measuring an object's relative location within a predefined measurement space wherein said apparatus uses a single light-receiving unit positioned at a corner area of said measurement space, said apparatus is comprised of:
   a. at least two photo sensing units comprising said single light-receiving unit for receiving scattered light rays from the object wherein said photo sensing units are proximate to the same said corner area of said measurement space and each such photo sensing unit is located at a different spatial location enabling at least two different viewing angles of said object;
   b. at least two lenses positioned in front of said photo sensing units for condensing said scattered light rays;
   c. a spectrum filter positioned in the route of said light rays;
wherein an ambient light or external light source is used for transmitting light extending over said predefined measurement space and wherein
a coordinate calculating means is used for calculating locations where images of said object are created on said photo sensing units by using each output from said photo sensing units, and finding the relative spatial coordinates of said object by using the calculated locations of said images.

* * * * *